United States Patent [19]
Stewart et al.

[11] Patent Number: 5,504,907
[45] Date of Patent: Apr. 2, 1996

[54] POWER MANAGEMENT SYSTEM WITH ADAPTIVE CONTROL PARAMETERS FOR PORTABLE COMPUTER

[75] Inventors: Gregory N. Stewart; N. Albert Sato; Warren W. Startup, all of Austin, Tex.

[73] Assignee: Dell USA, L.P., Austin, Tex.

[21] Appl. No.: 26,384

[22] Filed: Mar. 4, 1993

Related U.S. Application Data

[63] Continuation of Ser. No. 656,647, Feb. 14, 1991, abandoned.

[51] Int. Cl.$^6$ ................................................ G06F 1/32
[52] U.S. Cl. .................... 395/750; 364/707; 364/273.1; 364/273.2; 364/273.3; 364/DIG. 1
[58] Field of Search ........................... 395/750, 575; 364/707; 371/66, 12

[56] References Cited

U.S. PATENT DOCUMENTS

| | | | |
|---|---|---|---|
| 4,381,552 | 4/1983 | Nocilini et al. | 364/707 |
| 4,665,536 | 5/1987 | Kim | 364/707 |
| 4,980,836 | 12/1990 | Carter et al. | 364/483 |
| 5,083,266 | 1/1992 | Watanabe | 395/275 |
| 5,167,024 | 11/1992 | Smith et al. | 395/375 |
| 5,218,704 | 6/1993 | Watts, Jr. et al. | 395/750 |
| 5,355,503 | 10/1994 | Soffel et al. | 395/750 |

*Primary Examiner*—Gopal C. Ray
*Attorney, Agent, or Firm*—Michelle M. Turner; David L. McCombs

[57] ABSTRACT

A system for automatically adapting the power conservation functions of a personal computer (PC) to the work patterns of any user. A power control system of the PC monitors activity of I/O devices and if upon the elapse of a first time interval a particular I/O device or combination of devices has not been accessed, one or more I/O devices are powered-down. Following power-down, the first time interval is incrementally increased if I/O activity immediately occurs thereafter, prior to elapse of a second time interval. This process may repeat itself several times until the first time interval reaches a maximum value. Alternatively, if, following power-down, I/O activity does not occur until after elapse of a third time interval, the first time interval is incrementally decreased until the first time interval reaches a minimum value. The system thereby automatically adapts to maximize power conservation during periods of low activity while preventing user disruption during periods of increased activity.

32 Claims, 2 Drawing Sheets

POWER MANAGEMENT SYSTEM WITH ADAPTIVE CONTROL PARAMETERS FOR PORTABLE COMPUTER

This application is a continuation of application Ser. No. 07/656,647, filed Feb. 14, 1991, for Portable Computer System with Adaptive Power Control Parameters, now abandoned.

TECHNICAL FIELD

The invention relates generally to power management systems for personal computers and specifically to a power management system having adaptive power control parameters.

BACKGROUND OF THE INVENTION

Because many of the components and peripheral devices of both desktop and portable personal computers (PCs) consume a great deal of power even when they are not active, power management systems have been developed which cause each component or peripheral device to operate in the lowest power consumption mode with respect to present demands thereon. For example, U.S. Pat. No. 4,980,836 to Carter et al. discloses a power management system for a portable PC in which various peripheral devices are monitored for I/O activity. After a predetermined period of I/O inactivity, the PC is "powered down", i.e., the system clock is halted and power is removed from the hard disk drive, the floppy disk drive, the liquid crystal display (LCD), and miscellaneous system circuitry, thereby effecting more efficient use of remaining battery power.

Since Carter, improvements in the basic power management system have been introduced which include options such as blanking the liquid crystal display (LCD) or monitor screen after a predetermined period of I/O inactivity or turning off the hard disk drive motor after the hard disk drive has not been accessed for a predetermined period of time. Furthermore, there may be provided more than one reduced power consumption mode. For example, there may be a "stand by" mode in which certain components, such as the LCD and the hard disk drive motor, are caused to enter a reduced power consumption mode but the processing speed of the central processing unit (CPU) is not affected. In a "sleep" mode, nearly all of the functions of the PC are slowed or halted, including the CPU. From the standpoint of power consumption, the sleep mode is substantially equivalent to turning the PC off, except that no data is lost.

None of these power management systems fully responds to the fact that the various users of a single PC will most likely have differing work habits and preferences. For example, some users take frequent breaks throughout their work session but would prefer that the display not be blanked during each break, while others are prone to forget to turn off the PC following a work session. Some users want to maximize the battery life of a portable PC while others are concerned with avoiding the inconvenience of having the screen blank during data entry.

In addition to varying from user to user, the need for particular power management functions will vary from session to session, as different application programs will result in different work patterns. For example, a user will want to be able to examine a large spreadsheet or word processing entries without the screen being blanked at each momentary pause, but the same user will be indifferent to the screen being blank while the CPU is compiling a program or performing a scientific computation.

The above problems are partially solved by allowing the user to select the time-out parameters for particular program categories. Accordingly, by selecting the appropriate parameter values, a user is able to adapt the power management system to his or her own work habits with respect to a particular work session. For example, a longer time interval, such as ten or fifteen minutes, would be chosen for an application program which requires continuous I/O activity, such as word processing, than for one which performs scientific computations without a great deal of user input.

This solution is not entirely satisfactory, however, since a user will typically execute more than one application during a single work session, making it inconvenient for the user to change the timeout parameters each time he or she desires to use a different application. Further, novice users who are unaware of how to program the parameters will be forced to use the default parameters, which may not result in the most efficient use of power with respect to the particular work session. When time-out parameters are carelessly selected, the PC may often be caused to power-up or power-down at times which are inopportune or annoying to the user. As a result, the net power savings may be insignificant.

A power management solution is needed which both minimizes power consumption of the PC and which automatically adapts to the particular user's pattern of PC activity.

SUMMARY OF THE INVENTION

The foregoing problems are solved and a technical advance is achieved by method and apparatus for personal computer (PC) power management in which the control parameters for power-down of PC components are automatically adapted to patterns of PC use. In a departure from the art, the time-out interval after which components of the PC transition to a reduced power consumption state is automatically decreased when user activity is relatively infrequent, and automatically increased when user activity is relatively frequent. The PC thereby automatically adjusts to the habits of the user in power-down of PC components for maximum power conservation during periods of relative inactivity, yet without inconvenience to the user during periods of increased activity.

A power control system of the invention comprises a dedicated power management microcontroller which monitors PC activity to detect occurrences in which the PC is caused to exit a reduced power consumption mode. When the reduced power mode is exited shortly after having been entered, the time-out parameters are temporarily overridden and incrementally extended. When the reduced power mode is exited long after having been entered, the time-out parameters are temporarily overridden and incrementally shortened. The user may still select time-out parameters and may further select whether the adaptive modification function is enabled or disabled. When this function is enabled, the power management system will adapt its power management strategy in response to the actual work pattern of the user.

In an illustrative embodiment, the apparatus comprises a power control system, a processing complex and various I/O devices capable of operating in a reduced power consumption state interconnected via a system bus. The power control system monitors the activity of the various I/O devices. If upon the elapse of a first predetermined time interval a particular device or combination of devices has not been accessed, the power control system generates signals to place the device in a reduced power consumption state. Following placement of the device in a reduced power consumption state, the predetermined time interval is incrementally increased if I/O activity immediately occurs thereafter, prior to elapse of a second predetermined time interval. This process may repeat itself several times, until the predetermined time interval reaches a maximum value.

Likewise, the control system functions to incrementally decrease the first predetermined interval between power-down of devices. Following placement of the device in a reduced power consumption state, the first predetermined time interval is incrementally decreased if I/O activity does not occur until after elapse of a third predetermined time interval. This process may repeat itself several times, until the first predetermined time interval reaches a minimum value.

A technical advantage achieved with the invention is that the adaptive adjustments to the power-down intervals occur automatically, based on the particular user's work patterns.

A further technical advantage achieved is that PC power conservation is maximized, yet without unduly interrupting the activities of the user.

DETAILED DESCRIPTION OF THE PREFERRED EMBODIMENTS

Figure 1:
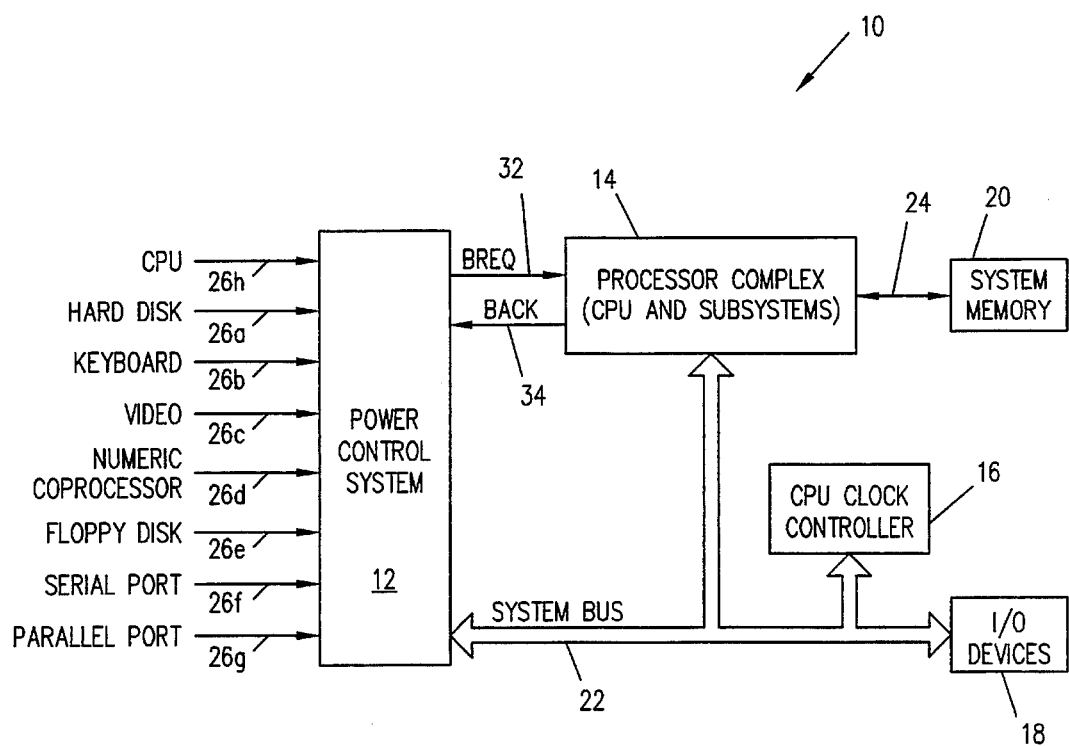
FIG. 1 is a functional block diagram of a personal computer embodying features of the power management control system of the present invention.

In FIG. 1, the reference numeral 10 designates a personal computer system embodying features of the present invention. The system 10 comprises a power control system 12, a processor complex 14, a CPU clock controller 16, several I/O devices 18, and a system memory 20. A system bus 22 interconnects the power control system 12, processor complex 14, CPU clock controller 16 and I/O devices 18. While not shown, it is understood the processor complex 14 includes a CPU and associated subsystems normally required for operation of a personal computer. For example, portions of the complex 14 may include a commercially available single chip solution or "chip set." A bus 24 connects the system memory 20 to the complex 14.

Although not shown, it is understood that the I/O devices 18 may include hard disk drives, floppy disk drives, a keyboard, a video monitor, a mouse, a numeric coprocessor, various serial and parallel ports, and other similar I/O or peripheral devices used in connection with a personal computer. Since these devices are well known, they will not be described further.

The power control system 12 is a microprocessor system which includes CPU, memory and I/O components (not shown). The system 12 monitors the activity of the I/O devices 18 via lines 26a–26g, connected with conventional circuitry (not shown) to the I/O devices. The lines 26a–26g are connected to exemplary hard disk, keyboard, video, numeric coprocessor, floppy disk, serial port and parallel port I/O devices 18, respectively. The system 12 monitors the status of the CPU (not shown) of the processor complex 14 via line 26h. It is understood that the signals on lines 26a–26h used for the monitoring functions are dependent upon the types of I/O devices used and the particular computer implementation. For example, in an IBM PC implementation of the processor complex 14, certain I/O devices generate interrupt signals to the CPU when accessed. The interrupt signals are thus also indicated on the particular line 26a–26g to the power control system 12. Other I/O devices may generate chip select signals, for example, which are detected on the appropriate line 26a–26g and input to the control system 12 in the above-described manner.

As will be described, a user may specify timeout parameters upon which a plurality of software activity timers, each specific to a particular I/O device or logical combination thereof, are based. In the event that a parameter is not specified, a default parameter is used. If upon polling a line 26a–26h the power control system 12 determines that the CPU or a particular device 18 is active, the corresponding activity timer is reset.

After a device has remained inactive for the predetermined interval of time, as indicated by the expiration of the corresponding activity timer, the control system 12 performs the functions necessary to place the CPU or particular I/O device or combination of devices in a reduced power consumption state. The system 12 gains control of the system bus 22 and then communicates with the particular I/O device 18 to place it in the reduced power consumption state, independent of the CPU of the processor complex 14. The system 12 gains control of the system bus 22 by issuing a bus request (BREQ) signal to the processor complex 14 via a line 32. The complex 14 acknowledges the BREQ signal with a bus acknowledge (BACK) signal via a line 34, to grant control of the bus 22 to the system 12. Upon receipt of the BACK signal, the control system 12 becomes the bus master for one clock cycle. The remaining devices competing for the use of the system bus 22 are slaves until the system 12 relinquishes control of bus. While not shown, it is understood that for an IBM PC AT implementation, the control system 12 becomes the bus master by using the MASTER control line.

It is understood that the operations to be performed by the system 12 while it is the bus master to power down the particular I/O devices 18 will depend upon the nature of the devices. For example, if the I/O device 18 is a hard disk drive, the control system 12 will write directly to the appropriate I/O port of the system 10 and set a bit, resulting in the hard disk drive's motor turning off. The motor will automatically turn on upon the next attempt at a hard disk drive access. If the device to be powered down is the CPU, the control system 12 will write to the CPU clock controller 16 to either slow or halt the CPU clock, again depending upon the particular implementation of the CPU. The powered-down device or devices are reactivated by the system 12 when activity is next required.

In accordance with a feature of the invention, the control system 12 automatically adjusts the value of the activity timer to either a longer or shorter time period, depending on the work pattern of the PC user. If the particular device 18 is powered-up within a relatively short time period after power-down, logic of the system 12 is implemented to incrementally adjust the activity timer to a longer time period, up to a predetermined maximum value. If the device 18 is powered-up after a relatively long time period after power-down, logic of the system 12 is implemented to incrementally adjust the activity timer to a shorter time period, down to a predetermined minimum value. In this manner, the control system 12 adapts to changing power demands of system 10 for increased efficiency and performance.

Figure 2:
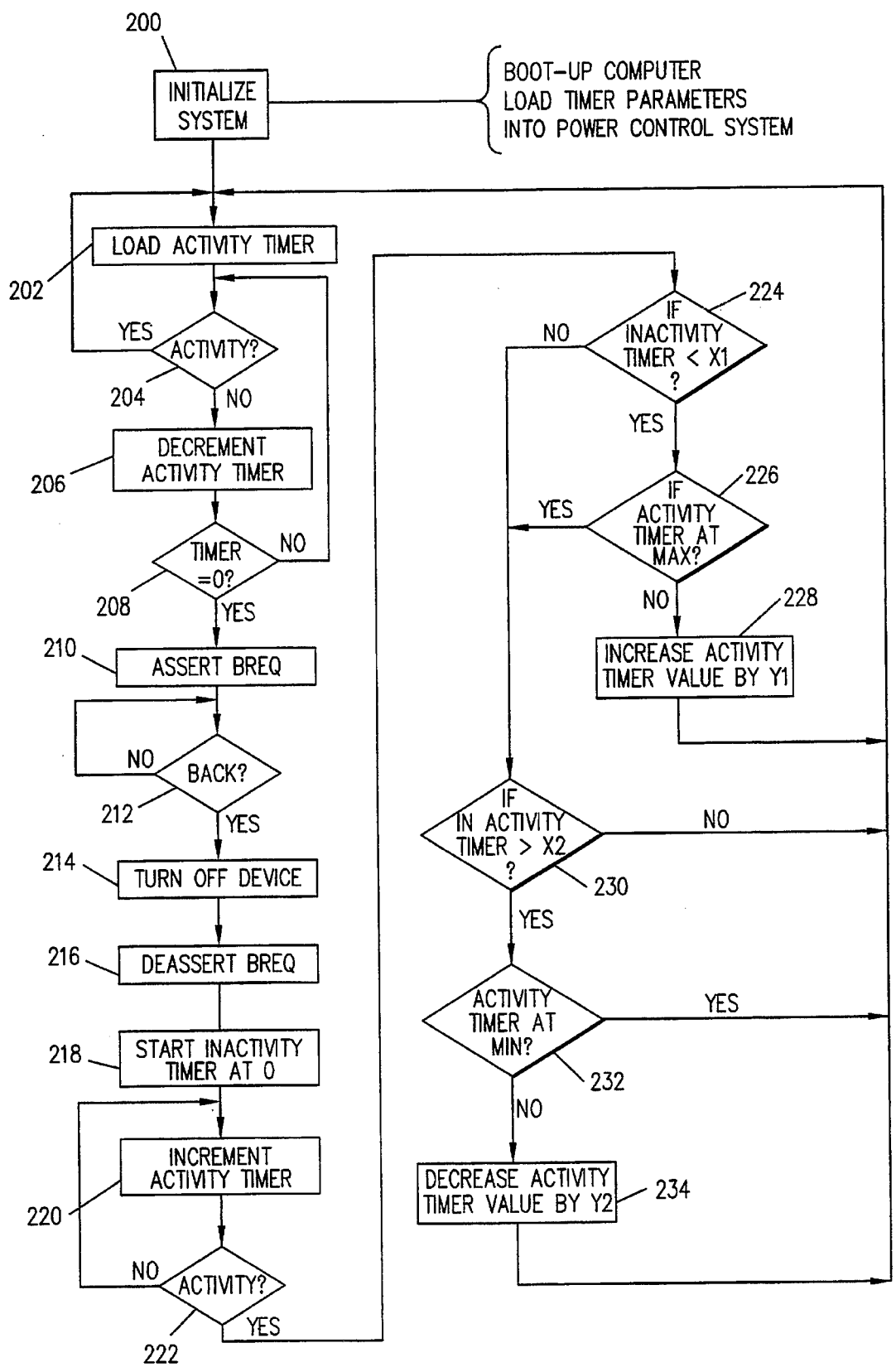
FIG. 2 is a flowchart of the logic implemented in the power management control system of FIG. 1.

FIG. 2 is a flowchart illustrating control logic implemented by the power control system 12 in accordance with the present invention. The control logic may be implemented by microcode instructions stored within the system 12. The flow chart exemplifies control logic further illustrated in the attached appendix. The control logic describes power consumption reduction and adaptive power management operations for one I/O device 18, it being understood that other devices are also controlled by similar logic. Further, it is noted that one or more devices 18 may be placed in a reduced power consumption state based on the activity of that device, a different device or combination of devices.

Execution begins in step 200 with the performance of initialization procedures. In step 202 an activity timer associated with the I/O device 18 is loaded in the system 12. It is understood that a user is able to specify the time-out parameters for the activity timer. Also, inactivity timer parameters associated with the device 18 are loaded in the system 12, the parameters being user specified and utilized, as discussed below, for adapting the value of the activity timer to a longer value or a shorter value, as determined by frequency of use of the device 18. Default parameters are provided if the parameters are not specified by the user.

When the activity timer is loaded in step 202, with either specified or default parameters, it is initialized to the time-out value. At step 204, the power control system 12 monitors the device 18 (or combination of devices) associated with the timer to determine whether the device is active. As indicated previously with reference to FIG. 1, activity of a device 18 is indicated by signals on the particular line 26a–26g or on line 26h for the CPU. If at step 204 the device 18 is active, execution returns to step 202 and the activity timer is reset. Otherwise, execution proceeds to step 206.

At step 206, the activity timer is decremented. At step 208, a determination is made whether the activity timer has expired, by decrementing to zero. If at step 208 the activity timer has not expired, execution returns to step 204. Otherwise, execution proceeds to step 210. At step 210, the power control system 12 issues a BREQ signal to the processor complex 14. At step 212, a determination is made whether the processor complex 14 has acknowledged the BREQ signal by issuing a BACK signal to the power control system 12. If a BACK signal is not received, execution remains at step 212 until received. Execution proceeds to step 214.

At step 214, the power control system 12 asserts control of the system bus 22 and becomes the bus master. The control system 12 then communicates on the system bus 22 with the device 18 to place it in the reduced power consumption state. At step 216, the BREQ is deasserted and the power control system 12 surrenders control of the system bus 22 to the processor complex 14.

At step 218, an inactivity timer is started from an initialized value of zero. At step 220, the inactivity timer is incremented. At step 222, a determination is made whether the device 18 is active. If not, execution returns to step 220. If at step 222 the device 18 is active, execution proceeds to step 224. At step 224, a determination is made whether the inactivity timer is less than a predetermined value X1. For example, the predetermined value may be on the order of about 5–10 seconds. If at step 224 the inactivity value is less than X1, execution proceeds to step 226, where a determination is made whether the activity timer is currently at its maximum prescribed value. If not, at step 228 the value of the activity timer is increased by a value of Y1. Y1 may be on the order of 30 seconds to a few minutes, depending on the particular device 18 associated with the activity timer. Execution then returns to step 202. By increasing the value of the activity timer at step 228 based upon the occurrence of device activity within a time period of less than X1, as determined by step 224, the system 12 adapts to increase the amount of time before the device 18 again powers-down. The system 12 thus patterns device 18 power reduction so that it is less frequent in periods of high demand.

If at step 224 the inactivity timer value is not less than X1, or if at step 226 the activity timer is at its maximum value, execution proceeds to step 230. At step 230, a determination is made whether the inactivity timer has been incremented to a value of greater than X2. X2 may be on the order of one-to-several minutes, depending upon the particular device 18. If the inactivity timer is not greater than X2, execution returns to step 202. If the inactivity timer is greater than X2, at step 232 a determination is made whether the activity timer is at a minimum value. The minimum value may be in the range of several seconds to a few minutes, depending on the initial value of the activity timer and a practical range for its value. If at step 232 the activity timer is at a minimum value, execution returns to step 202. If at step 232 the activity timer is not at a minimum, execution proceeds to step 234. At step 234, the activity timer value is decreased by a value of Y2. Y2 may be on the order of a few seconds to a several minutes, depending upon the particular device. Execution then returns to step 202. By decreasing the activity timer by an incremental value of Y2 at step 234 when there has been a period of device inactivity for greater than a time value of X2, the system 112 adapts to provide more frequent power-down the device 18, improving the power efficiency of the system 10. This is accomplished based upon a relatively low demand for use of the device 18, as determined by the logic.

The adaptive power management logic of the system 12 is readily illustrated where the device 18 is an LCD backlight of the system 10. Assuming the activity timer for the backlight is set for 5 minutes, the adaptive logic can be used to adjust this value down to a minimum value of one minute and a maximum value of 10 minutes, based upon user activity. If the user reactivates the backlight after its power-down within an inactivity period of less than ten seconds (X1), the logic of the system 12 would increase the activity timer by one minute (Y1) to a new value of six minutes. This procedure might occur several times until a maximum activity timer value of ten minutes is reached. The system 12 thus adapts to repeated reactivation of the backlight by powering down less frequently. On the other hand, if the user does not reactivate the backlight after power-down for an inactivity period of greater than three minutes (X2), the logic of the system 12 would decrease the activity timer by two minutes (Y2) down to a new value of three minutes. This would happen again until the minimum value of one minute is reached, given this pattern of use. The result would be improved power savings and less inconvenience to the user caused by unwanted power-downs of the backlight. Various activity timer and inactivity timer parameters may be employed, depending on the device 18 or devices to be managed.

In one preferred embodiment, the program control system 12 includes several user-programmable activity timers for managing the power consumption characteristics of the CPU and I/O devices 18. The activity timers include a "Standby" timer, an "Auto-Suspend" timer, a "Hard-Disk" timer and an "LCD" timer. Also included is a "Smart CPU" mode, which will be subsequently described in detail.

The Standby timer is used to specify the maximum length of time which may elapse between successive occurrences of I/O activity before the system 10 will be placed in a Standby mode, wherein the CPU and several I/O devices 18*a* are caused to operate in a reduced power consumption state. Specifically, the backlight of the LCD (not shown) is extinguished, the hard-disk drive motor (also not shown) is halted and the CPU clock controller 16 is slowed to a speed of 0 megahertz (MHz). With this timer set, the system 12 monitors I/O activity and resets the timer upon detection of any I/O activity. For example, I/O activity that would cause a resetting of the timer would include accessing a hard drive, using a keyboard, modem, serial port or parallel port. A suggested user setting for the Standby timer is within a range of 10 to 15 minutes, although other settings may be chosen. Upon the occurrence of any I/O activity, the system 10 automatically exits Standby mode and is returns to its previous full power mode.

The Auto-Suspend timer is used to specify the maximum length of time which may elapse between successive occurrences of I/O activity before the system 10 will be placed in a Suspend mode. The Suspend mode causes a more extensive reduction in power consumption with respect to the CPU and several I/O devices 18. In addition to deactivating the I/O devices 18 mentioned above, the system 12 also deactivates microcontroller cache memory, keyboard, any mouse and numeric coprocessor devices, and various system clocks. In Suspend mode, the system 10 consumes only enough power to maintain data stored in the system memory 20. The Auto-Suspend timer is reset upon any I/O activity, as discussed above. A suggested user setting for the Auto-Suspend timer is within a range of 20 to 30 minutes, although other settings may be chosen. Upon the occurrence of any I/O activity, the system 10 automatically exits Suspend mode and returns to its previous full power mode.

The Hard-Disk timer is used to specify how much time may elapse between successive hard disk accesses before the hard disk drive motor is halted. A suggested user setting for the Hard-Disk timer is within a range of 1 to 15 minutes, although other settings may be chosen. Once halted, the hard disk is reactivated automatically upon the next hard disk access attempt.

The LCD timer is used to specify how much time may elapse between periods of I/O activity before the LCD backlight is extinguished. A suggested user setting for the LCD timer is within a range of 1 to 15 minutes, although other settings may be chosen. Once extinguished, the LCD backlight automatically returns to its full power state upon any I/O activity.

The Smart-CPU function is used to reduce the power consumption of the CPU of the processor complex 14 and may be enabled or disabled by a user when setting the above timer values. Upon elapse of the Smart-CPU timer the CPU clock controller 16 is slowed to a reduced speed, such as approximately 3.125 MHz. With this timer set, the system 12 monitors I/O activity and resets the timer upon detection of any I/O activity. The Smart-CPU timer is set for a relatively short interval of time, for example, 12 seconds. The reduced speed mode is useful for conserving power when the CPU is not performing demanding processing functions.

It is understood that the present invention can take many forms and embodiments. The embodiments shown herein are intended to illustrate rather than to limit the invention, it being appreciated that variations may be made without departing from the spirit of the scope of the invention. For example, the processor complex 14 may be implemented using any commercially available CPU and associated subsystems, including PC-compatible, RISC-based, Macintosh or other systems. Furthermore, the power control system 12 may be configured to monitor I/O and peripheral devices other than those discussed herein, expansion cards and other components used in association with personal computers. The values of the various timers may be selected according to desired parameters.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

APPENDIX A

```
;       NAME    APOLLO.EQU
;       TITLE   Equates for the COP

;***********************************************************************
;*      Copyright (c) 1990 Dell Computer Corporation, Inc. This program *
;*      contains proprietary and confidential information. All rights reserved *
;*      except as may be permitted by prior written consent.            *
;***********************************************************************

;***********************************************************************
;       Revision Information    $Revision:  1.46 $
;                               $Date:   04 Nov 1992 17:47:20 $
;***********************************************************************

; The following are register definitions second  = 0F0           ;Decremented by T0 to count 5.12msec
                                ; intervals in one second
        minute  = 0F1           ;Decremented once per second to form
                                ; 1 minute counter
        syscnt  = 0F2           ;System activity timer
        hdcnt   = 0F3           ;Hard disk activity timer, also used
                                ; in charging bank A
        lcdcnt  = 0F4           ;LCD activity counter, also used in
                                ; charging bank B
        CNT     = 0F5           ;Used for repeat count functions
        avcnst  = 0F6           ;Bank A voltage constant timer for charging
                                ; also used to control beep rate
        bvcnst  = 0F7           ;Bank B voltage constant timer for charging
                                ; also used to control beep count
        batcnt  = 0F8           ;Number of seconds to switch banks during battery
                                ; operation, also charger timeout in minutes
        tdelay  = 0F9           ;Used to provide settling time
        rtime   = 0FA           ;Run time for clock while in standby mode
        ERC     = 0FB           ;ON/OFF control to flash LED's
        pendng  = 0FF           ;register not used in COP888CF, used in APOLLO
                                ; to flag delayed operations ophigh  = 00
        oplow   = 01
        saveb   = 02
        savex   = 03
        TEMP    = 04
        batav   = 05            ;check order of battery v,c for best
        bacrg   = 06            ; arrangement *******************
        batbv   = 07
        bbcrg   = 08
        batrv   = 09
        battmp  = 0A
        batac   = 0B
        batbc   = 0C
        baimin  = 0D
```

APPENDIX A

```
    bbimin  = 0E
    avwork  = 0F
    psave   = 011
systim  = psave              ;System sleep mode timeout
hdtim   = systim + 1  ;Hard disk timeout
lcdtim  = hdtim + 1   ;LCD backlight timeout
sysbyt  = lcdtim + 1  ;System flags
    xsumpd = sysbyt + 1      ;Checksum of system data for power validation
    mode   = xsumpd + 1
    crgmde = mode + 1
    flashb = crgmde + 1      ;LED flash and beeper control
    batmsc = flashb + 1      ;Miscellaneous battery flags
    restim = batmsc + 1      ;# of seconds of reserve operation
    brvmax = restim + 1      ;used by reserve battery charger
    bavmax = brvmax + 1      ;high voltage after switch
    bavmin = bavmax + 1      ;low voltage on A bat before switch
    bbvmax = bavmin + 1      ;highest voltage after switch
    bbvmin = bbvmax + 1      ;lowest voltage on B bat before switch
    alrmct = bbvmin + 1      ;number of seconds standby switch is pressed
    hdcmd  = alrmct + 1
    ckadr  = hdcmd + 1
    ckdata = ckadr + 1
    rsrvd1 = ckdata + 1      ;currently not used in 320N(+). for CRGMON compatibility
    lcdseq = rsrvd1 + 1      ;lcd sequencing control
    debug  = lcdseq + 1      ;debug flags register
    rsrvd2 = debug + 1       ;currently not used in 320N(+). for CRGMON compatibility
    initemp = rsrvd2 + 1     ;initial temp.
    avsave = initemp + 1     ;last 8 voltage readings on the A battery
    achrge = avsave + 8      ;Last 8 charge current readings on the A batt
    bvsave = achrge + 8      ;last 8 voltage readings on the B battery
    bchrge = bvsave + 8      ;Last 8 charge current readings on the B batt
    rvsave = bchrge + 8      ;last 8 voltage readings on the Reserve batt
    transb = rvsave + 8      ;Transfer buffer ackprt = portgp bit     6
    dack   = mask ; Constants used in this program timcnt = 46875+256+1     ;46875 counts = 4 minutes at 8MHz clock
    seccnt = 195             ;195.3125 counts per second
    min1   = 60              ;seconds in 1 minute
    min4   = 240             ;240 seconds in 4 minutes (error=75=.384sec)
    vterm  = 128    ;135             ;A/D calibration for 7.5v
    v1cell = 156             ;voltage @800ma with 1 cell shorted
    v2cell = 163    ;9volts  ;voltage @800ma with 2 cells shorted
    v2cnmh = 145    ;8volts  ;NiMH @800ma with 2 cells shorted
    vrmin  = 194             ;194 counts = 5.298v
    vrnom  = 201             ;201 counts = 5.489v
    ilchrg = 181    ;**200             ;199.85 = 800ma.
    ihchrg = 210    ;**231             ;231.07 = 925ma.
```

APPENDIX A

```
maxcrg  = 07E           ;6.25K
mindlt  = 3             ;minimum delta to allow battery switch .if     nimh
mincrg  = 07            ;trickle at 40-50ma.
deltai  = 3 :1          ;+delta I >= 8ma
.else
mincrg  = 0A            ;trickle at 80-100ma.
deltai  = 3             ;+delta I >= 12ma (old board is noiser
.endif deltav  = 2             ;-delta V > 55mv.
maxv    = 214           ;saturation voltage of power supply
avcur   = 105           ;avreage current
midptv  = 150           ;mid point voltage
mxctim  = 165           ;don't charge nicad more than 2.75 hours
mxniht  = 225           ;3 hours 45 min for NiMh batt
loniht  = 58            ;Minimum NiMH temp =  32 deg F (0 C)
hiniht  = 176           ;Maximum NiMH temp = 104 deg F (40 C)
maxnih  = 230           ;Maximum temp during charge 137.6F (58.6C)
cvtimr  = 40            ;number of minutes of constant voltage
lb1dlt  = 10            ;delta V to initiate low bat 1 mode
lb1dmh  = 10            ;delta V for low bat 1 with NiMH battery
lb2dlt  = 14            ;delta for low bat 2 mode
poasec  = 1             ;number of seconds before power on alarm
beepct  = 182           ;2.2KHz = 182 clocks per 1/2 cycle
btime   = 01FFF         ;.08sec duration
flgval  = 0A5           ;initialization flag
wdval   = 0D9           ;Watch dog setting for 64K window
fulcrg  = 187           ;indication of full charge when Delta i is reached ; SRAM Data address assignments sinitf  = 01E02         ;initial operation flag (set to A5 when sram cleared)
sresti  = 01E03         ;save address for reserve battery operation time
srescr  = 01E04         ;number of times reserve has been charged
sresdi  = 01E06         ;number of times reserve switched in
dmy008  = 01E08
dmy009  = 01E09
dmy00A  = 01E0A
dmy00B  = 01E0B
dmy00C  = 01E0C
dmy00D  = 01E0D
dmy00E  = 01E0E
dmy00F  = 01E0F
dmy010  = 01E10
dmy011  = 01E11
dmy012  = 01E12
dmy013  = 01E13
dmy014  = 01E14
dmy015  = 01E15
dmy016  = 01E16
```

APPENDIX A

```
dmy017 = 01E17
dmy018 = 01E18
dmy019 = 01E19
dmy01A = 01E1A
dmy01B = 01E1B
dmy01C = 01E1C
dmy01D = 01E1D
dmy01E = 01E1E
dmy01F = 01E1F
dmy020 = 01E20
dmy021 = 01E21
dmy022 = 01E22
dmy023 = 01E23
dmy024 = 01E24
dmy025 = 01E25
dmy026 = 01E26
dmy027 = 01E27
dmy028 = 01E28
```

; MILES OP pin assignments
;
; OP Low byte

```
        bit     0
        drq5    = mask          :output to AT DMA controller bit     1
        master  = mask          :output to AT bus MASTER* bit     2
        lcdon   = mask          :signal to inverter pcb module (Vcc)

bit     3
        csclr   = mask          :clears chip select latch when 0 bit     4
        bankb   = mask          :Select battery A or B bit     5
        lowbat  = mask          :light low battery LED bit     6
        chrgrb  = mask          :charges the reserve battery when high bit     7
        vddon   = mask          :turns on Vdd to LCD when high
```

; OP High byte

```
        bit     8
        ampson  = mask          :Turn on power to opamps bit     9
```

APPENDIX A

| | | | |
|---|---|---|---|
| dcoff | = mask | ;active high pulse kills system power |
| bit | 10 | | |
| speakr | = mask | ;output to speaker from uController |
| bit | 11 | | |
| pd9020 | = mask | ;wakeup pin on 90C20 |
| bit | 12 | | |
| fetoff | = mask | ;1 turns off system switch bypass transistor |
| bit | 13 | | |
| hispd | = mask | ;output to HT21 1-> proclock=1/2 clkx2 |
| bit | 14 | | |
| a14 | = mask | ;A14 bank swap pin for uController SRAM |
| bit | 15 | | |
| iom | = mask | ;If high exception cycle is I/O, low memory |

; Port L bit assignments

| | | | |
|---|---|---|---|
| bit | 2 | | |
| bdt | = mask | ;Battery Detect interrupt low when installed |
| bit | 3 | | |
| hdcs0 | = mask | ;IDE chip select |
| bit | 4 | | |
| chrga | = mask | ;Bank_A PWM charge control |
| bit | 5 | | |
| cpuint | = mask | ;CPU interrupt line input |
| bit | 6 | | |
| kbdint | = mask | ;Keyboard interrupt |
| bit | 7 | | |
| vramcs | = mask | ;Video ram chip select |

; Port G bit assignments

| | | | |
|---|---|---|---|
| bit | 0 | | |
| ucint | = mask | ;Signal from MILES when CSTAT is cleared |
| bit | 1 | | |
| wdout | = mask | ;Watch dog timer output |
| bit | 2 | | |
| syson | = mask | ;High if system switch on |
| bit | 3 | | |

APPENDIX A

| | | |
|---|---|---|
| chrgb | = mask | ;Bank_B PWM charge control |
| bit | 4 | |
| swx | = mask | ;Low true Standby Switch Pressed |
| bit | 5 | |
| ioact | = mask | ;Floppy, ser, print, or IRQ8 active |
| bit | 6 | |
| dack5 | = mask | ;DMA ack from CPU to allow uC to access bus |
| bit | 7 | |
| spareg | = mask | ;Spare I/O |

; Timer on/off control bit

| | | |
|---|---|---|
| bit | 4 | |
| txc0 | = mask | ;Same bit position for both timers |

; Port C bit assignments

| | | |
|---|---|---|
| bit | 0 | |
| milsad | = mask | ;Address strobe for MILES OP registers |
| bit | 1 | |
| milstb | = mask | ;Strobe bit for MILES OP registers |
| bit | 2 | |
| crgled | = mask | ;When low lights charge led |
| bit | 3 | |
| rbin | = mask | ;When low reserve battery is enabled |
| bit | 4 | |
| pwrled | = mask | ;Low lights power LED |
| bit | 5 | |
| rfresh | = mask | ;Low outputs refresh pulse to bus |
| bit | 6 | |
| nimhd | = mask | ;Low indicates Ni Metal Hydride battery |
| bit | 7 | |
| acav | = mask | ;Low indicates AC available |

; MODE byte definitions

| | | |
|---|---|---|
| bit | 0 | |
| hldreq | = mask | ;Set when system in hold |
| bit | 1 | |

APPENDIX A

| | slpmde | = mask | ;Set when in sleep mode |
|---|---|---|---|
| ; | bdt | = bit 2 | ;Battery detect - high when battery removed |
| | bit | 3 | |
| | lobat1 | = mask | ;Indicator that system is in low bat 1 mode |
| | bit | 4 | |
| | lobat2 | = mask | ;Indicator that system is in low bat 2 mode |
| | bit | 5 | |
| | lobat3 | = mask | ;Indicator that system is about to shutoff |
| | bit | 6 | |
| | notrkl | = mask | ;Flag to disable trickle charge |
| | bit | 7 | |
| | crgdly | = mask | ;1 to indicate start of charge cycle |

; CRGMDE charge mode byte definitions

| | bit | 0 | |
|---|---|---|---|
| | trklec | = mask | ;trickle charge active |
| | bit | 1 | |
| | camax | = mask | ;reached maximum on bank a |
| | bit | 2 | |
| | cbmax | = mask | ;reached maximum on bank b |
| ; | chrgb | = bit 3 | ;Bank_B charging |
| ; | chrga | = bit 4 | ;Bank_A charging |
| ; | cpuint | = bit 5 | ;set when Timer interrupt active |
| ; | chrgrb | = bit 6 | ;Set when the reserve battery is charging |
| | bit | 7 | |
| | charge | = mask | ;Set when charger active |

; BATMSC miscellaneous battery flag definitions

| | bit | 0 | |
|---|---|---|---|
| | cngben | = mask | ;Set if battery bank switch enabled |
| | bit | 1 | |
| | cngoff | = mask | ;Turn off Rbat after bank change |
| | bit | 2 | |
| | apwmup | = mask | ;Bat A PWM 1 = increment. 0 = decrement |

APPENDIX A

|  |  |  |
|---|---|---|
| bit | 3 | |
| bpwmup | = mask | ;Bat B PWM 1 = increment, 0 = decrement |
| bit | 4 | |
| initdc | = mask | ;set during initial discharge cycle |
| bit | 5 | |
| chrged | = mask | ;set if battery has been charged |
| bit | 6 | |
| nihdet | = mask | ;set if NiMH battery detected |
| bit | 7 | |
| adfail | = mask | ;set if OP amp latchup is detected |

; FLASHB Flash and beep control byte definitions

|  |  |  |
|---|---|---|
| bit | 0 | |
| poa | = mask | ;Power on Alarm set when case closed |
| bit | 1 | |
| poabep | = mask | ;Audiable alarm flag |
| ; syson | = bit 2 | ;High if system switch on |
| bit | 3 | |
| lb1bep | = mask | ;High to enable beep for low bat 1 |
| bit | 4 | |
| blinkc | = mask | ;High to enable blinking the charge LED |
| bit | 5 | |
| stdeb1 | = mask | ;set to debounce standby button |
| bit | 6 | |
| stdeb2 | = mask | ;2nd debounce bit |
| bit | 7 | |
| crton | = mask | ;1 if CRT active |

; LCDSEQ Control byte for LCD power sequencing operations

|  |  |  |
|---|---|---|
| bit | 0 | |
| bit | 1 | |
| cycdly | = mask | ;power cycle delay in progress |
| bit | 2 | |
| dlycdn | = mask | |
| bit | 3 | |
| sync | = mask | ;used to syncronize lcd timing |

APPENDIX A

```
        bit     4
        hdpnd  = mask          ;when set HD access is pending bit     5
        oneuk  = mask          ;when set do 1 timer tick delay bit     6
        seqoff = mask          ;set to signal backlight off sequence bit     7
        seqon  = mask          ;set to signal backlight on sequence ; SYSBYT System byte definitions bit     0
        syssec = mask          ;1 if system timeout in seconds bit     1
        hdsec  = mask          ;1 if hard disk timeout in seconds bit     2
        lcdsec = mask          ;1 if Display timeout in seconds bit     3
        acovrd = mask          ;1 if AC override enabled bit     4
        stbyen = mask          ;1 if standby button is enabled bit     5
        s386   = mask          ;1 if 386 host. 0 if 286 bit     6
        flshmd = mask          ;1 if flash programming mode enabled bit     7
        pmflg  = mask          ;1 if COP not allowed to access bus ; DEBUG bit flags bit     0
        cet    = mask          ;get snapshot of charge end test bit     1
        act    = mask          ;snapshot of adjust charge decision bit     2
        lbt    = mask          ;snapshot of low bat test bit     3
        lb1a   = mask          ;low bat 1 on bank A
```

APPENDIX A

```
        bit     4
        lb1b    = mask          ;low bat 1 on bank B bit     5
        lb2a    = mask          ;low bat 2 on bank A bit     6
        lb2b    = mask          ;low bat 2 on bank B bit     7
```

; Switch status byte

:        Bit  0 = 1 if in Low Bat 2 mode
:        Bit  1 = 1 if in Low Bat 3 mode
:        Bit  2 = 1 if the Main Battery is installed
:        Bit  3 = 1 if bank B is selected, 0 for bank A
:        Bit  4 = 1 if Standby Button is currently pressed
:        Bit  5 = 1 if in Low Bat 1 mode

```
        bit     6
:       nimhd   = mask          ;Low indicates Ni Metal Hydride battery
```

:        Bit  7 = 1 if AC power is present

APPENDIX A

;       NAME    PWRMGMT.MAC

;*********************************************************************
;* Copyright (c) 1990, 1991 Dell Computer Corporation, Inc. This program  *
;* contains proprietary and confidential information. All rights reserved *
;* except as may be permitted by prior written consent.                *
;*********************************************************************

;*********************************************************************
;       Revision Information   $Revision: 1.80 $
;                              $Date: 10 Nov 1992 13:59:04 $
;*********************************************************************

; This program uses the Idle timer of the COP888CF for its time reference.
; At an 8MHz clock this coresponds to a resolution interval of 5.12 msec.
; (4096 counts at .8MHz per timer tick)

; This program begins by setting up the ports for direction and
; enabling the watch dog timer.

```
        jp      start
        .byte   'N31'
        .if     nimh
        .byte   ' NiMH'
        .else
        .byte   ' NiCd'
        .endif
Start:
        jsrl    Init
        jsrl    xsump                   ;test the validity of the current params
        ifeq    a, xsumpd
        jp      sysok ld      systim, #0              ;set default values
        ld      hdtim, #0
        ld      lcdtim, #0
        ld      sysbyt, #020
sysok:
        jsr     stmout                  ;set the initial timeouts setbit  pmflg, sysbyt           ;delay buss access until pm command
        ld      portcd, #01C            ;initial C port data
        ld      portcc, #01F            ;make C0 and C1 - C4 outputs
        ld      b, #oplow
        ld      [b], #0
        jsr     putlow
        ld      b, #ophigh
        ld      [b], #ampson+fetoff     ;Start at high speed, video off, opamps on
        jsr     puthi                   ;This is to get around powerup
                                        ; problem with MILES
```

APPENDIX A

```
          jsr     dely50                    ;Wait 50 msec for power to go away
          rbit    tpnd, icntrl              ;clear the T0 overflow bit
          setbit  hdcs0, wkedg              ;Look for low going edges
          jsrl    cksram                    ;check sram parameters
          jsrl    ckrbat                    ;test reserve
          bitif   syson, portgp             ;Is the power switch on?
          jp      swchon                    ; Yes, then normal start sequence
          clrbit  syson, flashb       ;**

bitif   acav, portcp              ;Next test for AC power
          jmp     spmoff                    ; Shouldn't be here if no AC ld      portcd, #01C              ;initial C port data
          ld      portcc, #017              ;make C0 - C2 outputs
          jsrl    c20off                    ;turn off video
          jsrl    stchrg                    ;start the charger
          sbit    enti, icntrl              ;enable T0 interrupt
          jmp     cmain                     ;main loop for charge
swchon:
          jsr     clrbsy                    ;try to reset bat detect bit
          bitif   acav, portcp              ;operating from AC
          jp      isbat
          jp      nstart
isbat:    bitif   bdt, portlp               ;operating from battery
          jmp     spmoff                    ;no battery or AC nstart:
          setbit  syson, flashb       ;**
          jsrl    c20on                     ;turn on video
          jsr     vinit                     ;initialize voltage readings
          jsr     dlypmd                    ;reset power monitoring mode
          ld      wkpnd, #0                 ;clear any pending interrupts
          setbit  bdt, wken                 ;enable battery detect interrupt
          sbit    enti, icntrl              ;enable T0 interrupt
          sbit    6, icntrl                 ;enable L port wakeup interrupt
          sbit    1, psw                    ; enable external interrupt
main:
          sbit    gie, psw                  ;global interrupt enable
          nop                               ;service all interrupts now
          nop
          nop
          rbit    gie, psw ; now turn them back off
          bitif   flshmd, sysbyt            ;are we programming a new rom?
          jp      main                      ; then loop till done
          bitif   syson, portgp             ;Monitor system switch
          jp      main00
          bitif   bdt, mode                 ;are we waiting for a new battery?
          jmp     reslop                    ;wait for new battery
          jmp     reset
main00:
          bitif   acav, portcp              ;test for ac available
          jp      main10                    ; if operating from batteries
          bitif   notrkl, mode              ;is trickle charge enabled?
          jp      main01                    ; no then don't turn on
```

APPENDIX A

```
           bitif    chrgrb, crgmde    ;if reserve battery being charged
           jp       main01            ; don't turn on trickle charger
           bitif    trklec, crgmde    ;Allow trickle charge when AC available
           jp       main01            ; if already set
           bitif    charge, crgmde    ;** remove for production
           jp       main01            ;**
           jsr      clrlob
           jsrl     trklon            ;start trickle charge
main01:
           bitif    bdt, portlp       ;test for battery presence
           jsr      clrbdt            ; and reset latch if removed
           jmp      main
main10:
           bitif    charge, crgmde
           jsrl     trklof            ;turn off the charger if no AC
           bitif    trklec, crgmde    ;only true if AC adapter just unpluged
           jsrl     trklof            ; turn off trickle charge
           bitif    bdt, mode         ;are we waiting for a new battery?
           jmp      reslop            ;wait for new battery before testing voltage
           bitif    lobat3, mode      ;are we about to shut down system?
           jmp      lo3lop            ;then wait for AC or new battery
           jmp      main              ;wait before measuring batteries locate   0                 ;make sure this is in first page
cksm00:
           laid
           ret ;
; The cop888cf has a vectored interrupt scheme. On an interrupt
; the program branches to the instruction at 0FFh. The program can
; then save the appropriate registers and issue a VIS instruction
; to branch to the interrupt handler.
;
           locate   0,0               ;make sure this is in first page .=0ff ; This routine saves the contents of A, B, and X on entry to an interrupt
; and restores them on exit.

push     a                 ;this is the only register we can save on stack
           x        a, b              ;move contents of b to a
           ld       b, #saveb         ;point to location to save B and X
           x        a, [b+]           ;save contents of original B register
           x        a, x              ;get contents of X register
           x        a, [b]            ;and save in data ram
           vis
restor:
           ld       b, #savex         ;point to location of saved X register
           x        a, [b-]           ;get old X contents
           x        a, x              ;and put back in X
           x        a, [b]            ;now get the saved contents of B
           x        a, b              ;and put it back in B
```

APPENDIX A

```
            pop     a                   ;now we're back where we started
            reti
;
; Timer T0 underflow interrupt vector
;
timer0:
            drsz    second              ;decrement seconds timer
            jp      tim00               ; and continue if not zero
            jsrl    decent              ;executed once every second
tim00:
            bitif   flshmd, sysbyt      ;don't check anything else if flash active
            jmp     tim04
            jsr     tstac
            bitif   syson, flashb       ;is the cpu operating
            jp      tim01
            jmp     tim04               ; if not skip standby and refresh
tim01:
            bitif   drq5, oplow         ;test for cpu in hold
            jsr     refrsh              ; and do refresh if so
            bitif   hldreq  mode        ;are we in standby mode
            jsrl    flashp              ; then flash the power led
            bitif   lobat2, mode        ;is the battery low
            jsrl    flshlb              ; then flash the low bat led
            ld      a, lcdseq;prepare to test flags
            ifne    a, #0               ; are any of them set?
            jsrl    sequen              ; then sequence lcd, etc.
            bitif   bdt, mode           ;test for operation on reserve
            jsr     tstnew              ; look for a new battery
            bitif   bdt, mode
            jmp     tim04               ;skip if waiting for battery
            bitif   lb1bep, flashb      ;have we just entered low bat mode?
            jsrl    lbbeep              ;then beep 5 times
            jsrl    tststb              ;check for standby activation
            ifeq    pendng, #0          ;test for hd routine pending
            jp      tim02
            bitif   hdpnd, lcdseq       ;if flag is set then
            jsrl    iow1f7              ;test hd busy status
tim02:
            bitif   cngoff, batmsc      ;Have we switched battery banks
            jsr     resoff              ; then turn off the reserve battery
            bitif   cngben, batmsc      ;Is battery change enabled?
            jsr     docngb              ; then actually switch the battery banks
tim04:
            ld      wdcnt, #wdval       ;service watch dog 2-65K window, clock monitor on
            rbit    tpnd, icntrl        ; reset timer interrupt pending
            jmp     restor locate  01.01F              ;make sure there is no overlap
```

; The interrupt vector table starts from the lowest priority vector
; which is the VIS default address and goes down to the highest
; priority vector, the software interrupt.

APPENDIX A

```
        .=01e0
        .addrw  visvec          ;Default VIS routine must not do a RETI
        .addrw  wakeup          ;Port L Wakeup interrupt
        .addrw  reserv          ;Timer 3 this should never occur
        .addrw  reserv          ;Timer 3 this should never occur
        .addrw  time2b
        .addrw  time2a
        .addrw  reserv          ;UART this should never occur
        .addrw  reserv          ;UART this should never occur
        .addrw  reserv          ;TBD this should never occur
        .addrw  microw          ;Microwire BUSY Low
        .addrw  time1b
        .addrw  time1a
        .addrw  timer0          ;Idle timer
        .addrw  extirq          ;Host CPU IRQ (CDONE)
        .addrw  reserv          ;NMI interrupt is reserved
        .addrw  swivec          ;Software interrupt (illegal instruction)

; Multi input wake-up/port L interrupt vector wakeup:
        ld      b, #wkpnd
        bitif   bdt, [b]        ;test for battery interrupt
        jsr     resvon          ; switch on the reserve bat
        bitif   bdt, mode       ;if reserve battery active
        jmp     restor          ; then dont check anything else
        bitif   hldreq, mode    ;are we in hold
        jp      wake00          ; then skip some tests
        bitif   vramcs, wkpnd   ;test for activity
        jsr     tstvid
wake00:
;       bitif   slpmde mode     ;is the processor asleep?
;       jp      wake01
;       jmp     restor          ; if not then cancel tests
wake01:
        bitif   kbdint, wkpnd   ;exit on keyboard interrupt
        jsr     hldoff          ;***
        bitif   cpuint, wkpnd   ;is cpu interrupt active
        jsr     shrton          ; turn on for 50 usec
        jmp     restor ; Default VIS vector visvec:
;       jmpl    tog
        jsrl    tog1
        jmp     start ; Microwire/plus busy low interrupt vector microw:
        rbit    ipnd, lcntrl    ;interrupt pending
```

APPENDIX A

```
        jmp     restor
;
; Software interrupt vector
;
reserv:                         ;***** TEMPORARY *****
swivec:
        jsrl    tog             ;Light all the LED's
        jp      .       ;**
        rpnd
        jmp     reset
;
; Timer T2 T2B interrupt vector
;
time2b:
        ld      b, #ophigh
        clrbit  speakr, [b]     ;turn off the speaker
        jsr     puthi
        rbit    1, t2cntrl
        jmp     restor
;
; Timer T2 T2A/underflow interrupt vector
;
time2a:
        ld      b, #opnigh
        setbit  speakr, [b]     ;turn the speaker on
        jsr     puthi
        rbit    ipnd, t2cntrl
        jmp     restor
;
; Timer T1 T1B interrupt vector
;
time1b:
        bitif   trklec, crgmde
        jp      tim1b0          ;don't turn off trickle charge
        jsr     t1off
        jsr     t2off
tim1b0:
        rbit    intr, icntrl    ;disable interrupts until the next beep
        rbit    1, icntrl
        ld      b, #ophigh
        clrbit  speakr, [b]     ;turn off the speaker
        jsr     puthi
        jmp     restor
;
; Timer T1 T1A/underflow interrupt vector
;
time1a:
        rbit    tpnd, psw       ;timer 1 interrupt pending
        jmp     restor decmin:
        bitif   charge, crgmde  ;are we charging the batteries?
        jmp     tstend          ; if so then check for end, etc.
        bitif   chrgrb, crgmde  ;are we charging the reserve battery?
```

APPENDIX A

```
            jsr     tstres          ; if so then test for -dV ld      a, sysbyt ;to speed up checks bitif   acav, portcp    ;test for ac available
            jp      min00           ;jmp if no AC
            bitif   acovrd, a       ;test for AC override
            jmp     stmout          ; and reset timeout counters if active
min00:
            bitif   hdsec, a        ;is the hd timeout in seconds?
            jp      min01
            jsr     rldhdc          ;reset the hard disk timeout
min01:
            ld      a, sysbyt ;to speed up checks
            bitif   lcdsec, a ;is lcd T.O. in seconds
            jp      min02
            jsr     rldlcd
min02:
            ld      a, sysbyt ;to speed up checks
            bitif   syssec, a ;is system T.O. in seconds
            ret
            jmp     rldsys tstac:
            bitif   syson, portgp   ;is power good true
            jp      tstflg          ; then make sure we know it
            bitif   syson, flashb   ;power is off, but
            jmp     reset           ; if we're here the cop doesnt know it's off
            ret
tstflg:
            bitif   syson, flashb   ;does the cop know we're on
            ret                     ; yes so just return
            jmp     reset           ; restart if cop thinks we're off cmain:
            bitif   syson, portgp   ;Monitor system switch
            jmp     reset
            bitif   acav, portcp    ;Next test for AC power
            jmp     copoff          ; Stop system if no AC bitif   bdt, portlp     ;test for new battery
            jsr     waitb           ; and start over
            sbit    gie, psw ;global interrupt enable
            nop                     ;service all interrupts now
            nop
            nop
            rbit    gie, psw ; now turn them back off
            jp      cmain waitb:
            jsr     acrgof          ;turn off A bat charger
            jsr     bcrgof          ;turn off B bat charger
            jmpl    stcrg1          ;test for new battery and restart if available
```

APPENDIX A

```
chklow:
        jsr     avrage              ;use running average for voltages
        bitif   flshmd, sysbyt      ;don't check if flash active
        ret
        bitif   lbt, debug
        jsrl    snap                ;take snapshot of system
        bitif   bankb, oplow        ;test for current bank
        jmp     tbmin               ; if bank B
        ld      a, batav  ;get the A bank voltage
        ifgt    a, #vterm           ; and test for cutoff value
        jp      chk00
toolow:
        ld      b, #mode
        bitif   lobat3, [b]
        ret                         ;don't do this twice
        bitif   lobat2, [b]         ;Already in lobat 2?
        jp      tooloo              ; then just change battery banks
        jsr     setlb2              ;else force all earlier flags in case battery
                                    ; is critically low at start
tooloo:
        jsr     cngbat              ;try to change batteries
        jp      setl3               ;if bank switch failed
        ret                         ; else try again on other bank
setl3:
        jsrl    stndby              ;put system in lowest power mode
        clrbit  kbdint, wken        ; and don't allow keypress to exit
        setbit  lobat3, mode        ;wait 10 sec for new battery or AC
        ld      minute, #min1/6 ;reset the minute counter for termination
        jmpl    stbeep              ;beep and prepare to turn off chk00:
        ld      b, #bavmin
        x       a, [b]              ;store the new "minimum"
        ifgt    a, [b]              ;is it really less
        jp      tbmax               ; if so continue
        x       a, [b]              ; else restore the old value
tbmax:
        ld      a, batbv  ;now read bank B's voltage
        ld      b, #bbvmax          ; and look for a maximum
        x       a, [b]              ;store the new maximum
        ifgt    a, [b]              ;is old value greater than new
        x       a, [b]              ; then put it back
tstdlt:
        .if     nimh
        ld      a, battmp
        ifgt    a, #3               ;test for NiMH battery
        setbit  nihdet, batmsc      ; and set the flag accordingly
        .endif ld      b, #bavmax          ;point to highest bat A voltage
        ld      a, [b+]
        sc                          ;for subtraction
        subc    a, [b]              ;calculate the delta
        bitif   lobat1, mode        ;are we already in low bat mode
```

APPENDIX A

```
            jp       tstdl2              ; then test for second delta

.if      nimh
            bitif    nihdet, batmsc      ;is this a NiMH battery
            inc      a                   ; then reduce required delta to adjust for
                                         ; lower battery impedance
            .endif ifgt     a, #lb1dlt          ;is it greater than cutoff?
            jsr      lobt1a              ;set low bat 1 on A & check if B has already been set
            ld       b, #bbvmax
            ld       a, [b+]             ;to test bank B
            sc
            subc     a, [b]
            bitif    lobat1, mode        ;are we already in low bat mode
            ret .if      nimh
            bitif    nihdet, batmsc      ;is this a NiMH battery
            inc      a                   ; then reduce required delta to adjust for
                                         ; lower battery impedance
            .endif ifgt     a, #lb1dlt
            jmp      lobt1b
            ret tstdl2:     bitif    lobat2, mode        ;are we already in lobat2 mode
            ret                          ;then just return
            ifgt     a, #lb2dlt          ;is it greater than cutoff?
            jsr      lobt2a              ;low bat 2 on bank A
            ld       b, #bbvmax          ; otherwise prepare to test bank b
            ld       a, [b+]             ;to test bank B
            sc
            subc     a, [b]
            bitif    lobat2, mode        ;are we already in low bat 2 mode
            ret                          ;if so, no need to test bank b
            ifgt     a, #lb2dlt
            jmp      lobt2b              ;low bat 2 on bank b
            ret lobt1a:
            jsr      chkbat
            ifgt     a, #midptv          ;is this the initial steep slope?
            ret                          ; then just return
            setbit   lb1a, debug         ;else it's low bat 1 on bank A
            bitif    lb1b, debug         ;is bank B in the same boat ?
            jp       setlb1              ;both banks have reached low bat 1
            ret
lobt1b:     jsr      chkbat
            ifgt     a, #midptv          ;is this the initial steep slope?
            ret                          ; then just return
            setbit   lb1b, debug         ;set bank B to low bat 1
```

APPENDIX A

```
          bitif     lb1a, debug        ;and test bank A
          jp        setlb1             ;both banks have reached low bat 1
          ret
setlb1:   setbit    lobat1, mode
          jsrl      beep5              ;do 5 beeps
          ld        b, #oplow
          setbit    lowbat, [b]        ;turn on the low bat LED
          jmp       putlow lobt2a:   setbit    lb2a, debug        ;it's low bat 2 on bank A
          bitif     lb2b, debug        ;is bank B in the same boat ?
          jp        setlb2             ;both banks have reached low bat 2
          ld        batcnt, #2         ; switch banks in 2 seconds
          ret
lobt2b:   setbit    lb2b, debug        ;set bank B to low bat 2
          bitif     lb2a, debug        ;and test bank A
          jp        setlb2             ;both banks have reached low bat 2
          ld        batcnt, #2         ; switch banks in 2 seconds
          ret
setlb2:   ld        b, #mode
          setbit    lobat2, [b]
          setbit    lobat1, [b]        ;force flag in case battery is critically low
          jsrl      strslp
          ld        avcnst, #1         ;to start flashing
          ld        bvcnst, #1         ; and beep
;**       jsr       cngbat             ;change to the other battery
;**       ret
          ret tbmin:
          ld        a, batbv           ;get the B bank voltage
          ifgt      a, #vterm          ; and test for cutoff value
          jp        chk01
          jmp       toolow chk01:
          ld        b, #bbvmin
          x         a, [b]             ;store the new "minimum"
          ifgt      a, [b]             ;is it really less
          jp        tamax              ; if so continue
          x         a, [b]             ; else restore the old value
tamax:
          ld        a, batav           ;now read bank A's voltage
          ld        b, #bavmax         ; and look for a maximum
          x         a, [b]             ;store the new maximum
          ifgt      a, [b]             ;is old value greater than new
          x         a, [b]             ; then put it back
          jmp       tstdlt             ;test for delta V getemp:
          ld        enad, #0A7         ;setup to read temperature
          jp        getrdg             ;takes 3 clock cycles
```

APPENDIX A

```
readan:
        ld      enad, #07       ;setup to read battery A's voltage
        nop                     ;Time delay to complete conversion
        nop
        nop
getrdg:
        jsr     delay1          ;wait 10 clock periods
        nop
        nop
        nop
        nop
        nop
        nop
        ld      a, adrslt       ;read A/D
        ld      enad, #0        ;Put A/D in low power mode
        ret readbn:
        ld      enad, #047      ;setup to read battery B's voltage
        jp      getrdg          ;takes 3 clock cycles
```

; CHKBAT determines which battery is currently selected and then reads
; the battery voltage. The voltage is returned in A. No other registers
; are disturbed.

```
chkbat:
        ld      a, #07          ;set single & divide by 16
        bitif   bankb, oplow    ;if on bank B
        or      a, #040         ; setup to read battery B's voltage
        x       a, enad         ;and enable A/D converter
        jsr     delay1          ;wait 10 clock periods
        nop                     ;Time delay to complete conversion
        nop
        nop
        nop
        nop
        nop
        nop
        nop
        nop
        ld      a, adrslt       ;read A/D
        ld      enad, #0        ;Put A/D in low power mode
        ret reslop:
        sbit    gie, psw        ;global interrupt enable
        nop                     ;service all interrupts now
        nop
        nop
        rbit    gie, psw        ; now turn them back off
        bitif   acav, portcp    ;test for AC adapter
        jp      res00           ; if operating from batteries
        jsr     tstn03          ;reenable normal operation
```

APPENDIX A

```
        jmp     main
res00:
        bitif   bdt, mode       ;wait for bdt to clear
        jp      reslop          ; until battery inserted
        ifeq    tdelay, #0
        jp      res01
        jp      reslop          ;wait before measuring batteries
res01:
        jsr     tbgood          ;next test for good battery
        jp      nogood
        jmp     main            ;start over with good battery nogood:
        jsr     setl3           ;set low bat 3 mode
        jmp     main lo3lop:
        sbit    gie, psw ;global interrupt enable
        nop                     ;service all interrupts now
        nop
        nop
        rbit    gie, psw ; now turn them back off
        bitif   acav, portcp    ;test for AC adapter
        jp      lo300           ; until AC plugged in
        jsr     tstn03          ;reenable normal operation
        jmp     main
lo300:
        bitif   bdt, mode       ;check for battery presence &
        jmp     main
        jp      lo3lop          ; wait until battery removed or AC plugged in clrlob:
        jsrl    lblof0
        ld      b, #mode        ;This is the same number of bytes and one
        bitif   lobat3, [b]     ; less clock than testing mode directly
        jsr     hldoff
        ld      b, #mode
        bitif   lobat2, [b]
        jsr     hldoff
        ld      b, #mode
        clrbit  lobat3, [b]
        clrbit  lobat2, [b]
        clrbit  lobat1, [b]
        clrbit  lb1a, debug
        clrbit  lb1b, debug
        clrbit  lb2a, debug
        clrbit  lb2b, debug
        bitif   acav, portcp    ;test for ac available
        jp      clrl00          ; continue if no AC
        ld      b, #t2cntrl
        rbit    intr, [b] ;make sure beep interrupts are disabled
        rbit    2, [b]
        ld      b, #icntrl
```

APPENDIX A

```
            sbit     0, [b]              ;enable end interrupt
            sbit     1, [b]
clrl00:
            ld       b, #ophigh
            clrbit   speakr, [b]         ;turn off the speaker
            jmp      puthi ; TSTPOA tests to see if the case is closed and flashes led's or beeps
; accordingly.

tstpoa:
            ld       a, alrmct           ;get number of seconds switch is down
            ifgt     a, #poasec          ;more than 2 seconds
            jp       closed              ; then case must be closed
            inc      a
            x        a, alrmct           ;increment count
            ret closed:
            setbit   poa, flashb         ;set case closed flag
            bitif    acav, portcp       ;test for ac available
            jp       clos00              ; continue if no AC
            jsr      dspoff              ;turn off LCD if case closed.
            clrbit   poabep, flashb      ; but no alarm if AC present
            ret
clos00:
            bitif    crton, flashb       ;is the crt in use
            ret                          ; then don't beep
            bitif    hldreq, mode
            jp       clos01              ;if already in standby, don't do it again
            jsrl     stndby              ;put system in standby mode and
clos01:
            setbit   poabep, flashb      ; if on batteries then beep
            ret clrbdt:
            clrbit   bdt, wkpnd          ;make sure interrupt is clear clrbsy:
            ld       b, #oplow           ; clear io latch
            setbit   csclr, [b]          ; first write bit high
            jsr      putlow
            ld       b, #oplow
            clrbit   csclr, [b]          ; and then low again
            jmp      putlow stmout:
            ld       b, #syscnt
            ld       x, #systim
            ld       cnt, #3
initl:
            ld       a, [x+]             ;set the initial timeouts
            x        a, [b+]
            drsz     cnt
```

APPENDIX A

```
            jp       initl
            ret dlypmd:
            ld       tdelay, #12           ;delay 12 seconds for battery to stabalize
rstpmd:
            jsr      vinit
            ld       a, batav
            ld       b, #bavmax            ;point to start of table
            x        a, [b]                ; and set max and min to current
            ld       a, [b+]               ; readings
            x        a, [b+]
            ld       a, batbv
            x        a, [b]
            ld       a, [b+]
            x        a, [b]
            ret vinit:
            jsr      readad                ;setup the running average array
            jsr      readad                ; this is slower than doing only
            jsr      readad                ; the readings we need, but we only
            jsr      readad                ; do it once in a while
            jsr      readad
            jsr      readad
            jsr      readad
            jsr      readad
            jmp      avrage reset:
            ld       psw, #0               ;turn off all potential interrupts
            ld       icntrl, #0
            ld       cntrl, #0
            setbit   chrgb, portgd         ;make sure B charger FET is off
            ld       t2cntrl, #0
            setbit   chrga, portld         ;make sure A charger FET is off
            jsr      dely50
;           jsr      dspsp                 ;** debug
            ld       sp, #06F
            jmp      start ; REFRSH will output a stream of refresh pulses every 5.12 msec when
; the COP has the cpu in hold
;

refrsh:
            ld       b, #portcd
            setbit   rfresh, [b]
            setbit   rfresh, portcc        ;enable output only during refresh
            ld       cnt, #41 ;to average 1 refresh every 125 usec.
            bitif    s386, sysbyt          ; different refresh for 286 than 386
            jp       reflop                ; do 386 refresh
ref286:
            clrbit   rfresh, [b]           ; otherwise do 286
```

APPENDIX A

```
        jsr     delay1              ;to make 13.75 usec pulse
        nop                         ; stretch it out to 20 usec.
        nop
        nop
        nop
        nop
        setbit  rfresh, [b]
        jsr     delay1              ;to make 22.5 usec delay before next pulse
        drsz    cnt
        jp      ref286
        jp      refext              ;to turn off portc reflop:
        clrbit  rfresh, [b]
        nop                         ;to make 2.5 usec pulse
        nop                         ;one more for good measure
        setbit  rfresh, [b]
        drsz    cnt
        jp      reflop
refext:
        clrbit  rfresh, portcc      ;disable as soon as refresh is done
        clrbit  rfresh, [b]
        ret dsplon:
        clrbit  crton, flashb       ;indicate lcd active
        bitif   slpmde, mode        ; and exit sleep mode
        jmp     hldoff
dspon0:
        bitif   lcdon, oplow        ;is the LCD already on?
        ret                         ; then don't toggle pwrdwn ld      b, #lcdseq
        setbit  seqon, [b]
        setbit  onetik, [b]         ;to setup for next operation
        setbit  sync, [b]           ; synchronize with the timer tick
        ld      pendng, #4          ;set 20ms delay
        jsrl    c20off              ;assert pwrdwn* to 90c2x
        clrbit  vramcs, wken        ;disable wakeup on video activity
        clrbit  vramcs, wkpnd
        ld      b, #oplow           ;now the low byte
        setbit  vddon, [b]          ; to turn on the +5v to the LCD
;**     setbit  lcdon, [b]          ; to turn on the backlight inverter
        jp      putlow              ;do it and return to caller
```

; HSPEED and LSPEED are used to switch the processor speed by
; toggling the HIGHSPEED* line (OP 13) on MILES

```
hspeed:
        ld      b, #ophigh          ; point to contents of OP high byte
        clrbit  hispd, [b]          ; low for max clock speed
        jp      puthi               ; output to OP register lspeed:
```

APPENDIX A

```
            ld      b, #ophigh              ; point to contents of OP high byte
            setbit  hispd, [b]              ; set bit high for 1/2 clock speed
            jp      puthi                   ; output to OP register dsplof:
            setbit  crton, flashb           ;indicate crt active
            bitif   slpmdc, mode            ; and exit sleep mode
            jsr     hldoff
dspof0:
;**         ld      b, #lcdseq
;**         setbit  seqoff, [b]
;**         setbit  onetik, [b]             ;to setup for next operation
;**         setbit  sync, [b]               ; synchronize with the timer tick
;**         ld      pendng, #4     ;67      ;set 343ms delay
            ld      b, #oplow               ;set the OP low byte
            clrbit  lcdon, [b]              ; to turn off the backlight inverter
            clrbit  vddon, [b]              ; to turn off the +5v to the LCD
;           jp      putlow                  ; before the LCD controller ;           PUTLOW / PUTHI
;
; These routines write a byte pointed to by the B register to the MILES
; OP Low byte or OP High byte registers respectively
;
putlow:
            clrbit  milsad, portcd   ;C0 = 0
            jp      put
puthi:
            setbit  milsad, portcd   ;C0 = 1
put:
            ld      a, [b]
            x       a, portd                ;put the value in port D
            ld      b, #portcd              ;point to port C for faster access
            setbit  milstb, [b]             ;toggle c1 to a 1
            clrbit  milstb, [b]             ;reset to 0 to latch data
            ret ; HLDOFF restores the processor to full speed operation hldoff:
            bitif   hldreq, mode            ;Are we in hold mode?
            jp      hld00                   ; yes then turn cpu back on
            jp      hld01                   ; no then just exit sleep
; first set IO_M~ to IO in OPH
hld00:
            ld      b, #ophigh              ;point to the op register data storage
            setbit  iom, [b]                ; D port data = 10000000 for IO
            jsr     puthi ld      b, #oplow               ;restore normal value
            clrbit  drq5, [b]
            clrbit  master, [b]
```

APPENDIX A

```
            jsr     putlow
            clrbit  hldreq, mode            ;clear the flag
hld01:
            jsrl    c20on                   ;turn on the crt controller
            bitif   poa, flashb             ;don't turn on LCD if case closed
            jp      hld02
            bitif   crton, flashb           ; or the crt is active
            jp      hld02
            jsr     dspon0                  ;turn on the display
hld02:
            jsrl    endslp                  ;exit sleep mode
            bitif   charge, crgmde  ;**     ;are we charging
            jp      hld03
            jsr     stmout                  ;reload the timeout counters
hld03:
            clrbit  pwrled, portcd          ;turn the power/standby led on
            clrbit  kbdint, wkpnd           ;clear keyboard interrupt
            clrbit  kbdint, wken            ;turn off wakeup enable **********
            clrbit  cpuint, wken
            clrbit  cpuint, wkpnd
; now set IO_M~ to M in OPH
            ld      b, #ophigh              ;point to the op register data storage
            clrbit  iom, [b]        ;point to memory
            jmp     puthi                   ; and return ;
; RESVON turns on the reserve battery if the main battery is removed
;       On Entry  B points to WKPND
;
resvon:
            clrbit  nihdet, batmsc          ;clear the NiMH bit
            bitif   acav, portcp            ;test for ac available
            jp      resv01                  ;only turn on if no AC
            bitif   acav, portcp            ;test again to overcome glitches, when replacing battery
            jp      resv01                  ;only turn on if no AC
            clrbit  bdt, [b]        ;clear the interrupt
            clrbit  bdt, mode
            setbit  rbin, portcd            ; make sure the reserve is off :**
            ret
resv01:
            ld      minute, #min4/2         ;reset the minute counter for termination
            setbit  bdt, mode               ;set flag for new bat test
            clrbit  rbin, portcd            ;turn on reserve battery
            ld      [b], #0                 ;clear all the pending interrupts
            jsrl    stndby                  ;enter standby mode and
            clrbit  kbdint, wken            ; only exit on new battery or acav
;**         setbit  cpuint, wken
;           jsr     rstpmd
            ld      b, #ophigh
            clrbit  iom, [b]        ;make sure we're set to memory cycle
            jsr     puthi
            ld      a, #L(sresdi)           ;get # of times reserve has been activated
            jsrl    m1e00
            inc     a
```

APPENDIX A

```
        x       a, portd
        except  sramw, sresdi      ;save the count
        ifeq    portd, #0          ;did we wrap
        jsr     incrdi             ;then increment upper byte
        ld      tdelay, #50        ;debounce delay 250ms
        ret ; TSTNEW monitors the bdt line watching for a new battery to be installed tstnew:
        jsr     clrbsy             ;try to reset bat detect bit
        bitif   acav, portcp       ;did user plug in AC adapter?
        jp      tstn00             ; no then continue
        jp      tstn01             ; yes then cancel standby after delay
tstn00:
        bitif   bdt, portlp        ;check for battery presence
        jp      setdly             ; none yet
tstn01:
        clrbit  nihdet, batmsc     ;clear the NiMH bit for new battery
        drsz    tdelay             ;debounce time
        ret
tstn03:
        setbit  rbin, portcd       ;turn off reserve battery
        jsr     clrlob
        jsrl    ckrbat             ;test reserve
        clrbit  bdt, mode
        clrbit  poabep, flashb
;**     setbit  kbdint, wken       ; reenable keyboard interrupt
        ld      batcnt, #min1      ;reset battery timer and don't switch
        setbit  initdc, batmsc     ; also signal PM for initial bat switch
        jsr     dlypmd             ;initialize min and max for new bat
        jmp     hldoff             ;exit standby mode
setdly:
        ld      tdelay #200        ; 1sec debounce
        ret ; TBGOOD tests the new battery to see if it is above minimum voltage
; and skips the next instruction on return if the battery is good tbgood:
        bitif   acav, portcp       ;If AC plugged in then
        jp      tbg00
        retsk                      ;always return good
tbg00:
        jsr     chkbat             ;Then test new battery
;       bitif   lobat2, mode       ;** possibly eliminate        **
;       jp      tbgd2              ;** and require all new to be v+10 **
        ifgt    a, #vterm+16       ; must be above minimums
        retsk jsr     cngbat             ; if not try the other battery
        ret                        ;we can only get here if both
                                   ;banks are bad and no AC is available
```

APPENDIX A

```
            jsr     chkbat              ;read voltage on second bank
            ifgt    a, #vterm+16        ; above minimum?
            retsk                       ;start over with good battery
            ret tbgd2:
            ifgt    a, #vterm+10        ; allow at least 10 minutes operation
            retsk jsr     cngbat              ; if not try the other battery
            ret                         ;we can only get here if both
                                        ;banks are bad and no AC is available
            jsr     chkbat              ;read voltage on second bank
            ifgt    a, #vterm+10        ; allow at least 10 minutes operation
            retsk                       ;start over with good battery
            ret incrdi:
            ld      a, #L(sresdi+1)         ;get # of times reserve has been charged
            jsrl    m1e00
            inc     a
            x       a, portd
            except  sramw, sresdi+1         ;save the count
            ret tstvid:
            bitif   vramcs, wken        ;is test for activity enabled?
            jp      vid00
            clrbit  vramcs, wkpnd
            ret                         ; if not active
vid00:
            bitif   hldreq, mode        ;are we in standby mode
            ret                         ; if so then return
            bitif   crton, flashb
            jp      rstlcd
            jsr     dspon0              ;else make sure display is on
            jp      rstlcd rldlcd:
            bitif   vramcs, wkpnd       ;test for activity
            jp      rstlcd              ;if active
            ifeq    lcdcnt, #0          ;no timeouts if zero count
            ret
            bitif   crton, flashb       ;is the LCD or CRT active
            ret                         ; if CRT
            drsz    lcdcnt              ; else decrement counter
            ret                         ; and return
            setbit  vramcs, wken        ;enable wakeup on video activity
            clrbit  kbdint, wkpnd
            setbit  kbdint, wken        ; or a keypress
            jmp     dspof0              ;turn off display backlight & LCD rstlcd:
```

APPENDIX A

```
        ld      a, lcdtim
        x       a, lcdcnt   ;reset the lcd counter
        clrbit  vramcs, wkpnd
        jp      sysrst rldhdc:
        bitif   hdcs0, wkpnd    ;test for activity on hard disk
        jp      rsthd           ;if there is activity
        ifeq    hdcnt, #0       ;no timeouts if zero count
        ret
        drsz    hdcnt           ; else dcrement counter
        ret                     ; and return
        jmpl    drvof1          ;when we decrement to zero
rsthd:
        ld      a, hdtim  ;reset the timeout from system setting
        x       a, hdcnt
        clrbit  hdcs0, wkpnd
sysrst:
        ld      a, systim       ;reset system timeout if anything active
        x       a, syscnt
        clrbit  kbdint, wkpnd
        bitif   slpmde, mode    ; and exit sleep mode if active
        jsrl    endslp          ; wakeup CPU
        jmp     clrbsy          ;to clear out I/O activity flag rldsys:
        bitif   kbdint, wkpnd   ;test keyboard
        jp      sysrst
        bitif   ioact, portgp   ;test for any active I/O devices
        jp      sysrst
        ifeq    syscnt, #0      ;no timeouts if zero count
        ret
        drsz    syscnt
        ret                     ;if nothing active
        jsrl    drvof1              ;turn off the drive
        jsr     dspof0              ;turn off the display
        setbit  vramcs, wken    ;enable wakeup on video activity
;       setbit  hdcs0, wken     ; or hard disk activity
        jmpl    sleep
```

; READAD reads the A/D channels and maintains the last 8 values of each
; voltage and charge current in an array starting at location AVSAVE

```
readad:
        ld      enad, #07       ;Single conversion, divide by 16
        ld      b, #enad
        ld      x, #transb      ;use the transb location to pass readings
        rc
        nop                     ;delay to wait for conversion to
        nop                     ; be complete
        nop
adloop:
        nop
        nop
```

APPENDIX A

```
            nop
            nop
            nop
            nop
            nop
            nop
            ld      a, [b]                  ;get the enable command
            adc     a, #020                 ;bump to the next channel
            x       a, [b+]                 ; and start the next conversion
            ld      a, [b-]                 ;read the previous result
            x       a, [x+]                 ; and store it
            ifnc                            ;test for overflow
            jp      adloop                  ; and continue till done
            ld      enad, #0                ;Put A/D in low power mode bitif   charge, crgmde          ;Are we charging the batteries?
            jsrl    readv                   ; then turn off charge and reread voltage
    ;       jsr     forcer          ;     ;Used to test parameter passing ; Update arrays with latest readings ;       ld      b, #ophigh      ;
    ;       clrbit  speakr, [b]     ;**
    ;       jsr     puthi           ;**
    ;
    ;       bitif   acav, portcp            ;test for ac available
    ;       jsr     adjv                    ; adjust if operating from batteries ld      x, #transb              ;address of A/D value array
            ld      b, #avsave              ;pointer to 1st element for A Batt
            ld      cnt, #5
    update:
            ld      a, [x+]                 ;get a reading
    ;**     ifeq    a, #0FF  ;** test
    ;**     setbit  adfail, batmsc  ;** test
            jsr     rotate                  ; and add it to the array
            drsz    cnt
            jp      update
            ld      cnt, #3                 ;now do the discharge currents
            ld      b, #battmp
    uploop:
            ld      a, [x+]                 ;get the A current
            x       a, [b+]                 ; and save it
            drsz    cnt
            jp      uploop
            ret forcer:
            ld      b, #transb
            clr     a
            ld      cnt, #8
    forlop:
            x       a, [b]
            ld      a, [b+]
```

APPENDIX A

```
        inc     a
        drsz    cnt
        jp      forlop
        ret
```

; AVRAGE averages the last 8 readings for each battery voltage and
; charge current and stores the 8 bit values in a table
;
```
avrage:
        ld      x, #avsave              ;point to the first set of 8 readings
        ld      b, #avwork              ;16 bit workspace
        jsr     avr
        x       a, batav                ;average battery A voltage
        jsr     avr
        x       a, bacrg                ;average batt A charge current
        jsr     avr
        x       a, batbv                ;average battery B voltage
        jsr     avr
        x       a, bbcrg                ;average batt B charge current
        jsr     avr
        x       a, batrv                ;average reserve battery voltage
        ret avr:
        clr     a
        x       a, [b+]                 ;clear the work area
        clr     a
        x       a, [b-]
        rc
        ld      cnt, #8
avloop:
        ld      a, [x+]                 ;get the next reading
        adc     a, [b]                  ; and add in the accumulated value
        x       a, [b+]                 ; save
        clr     a                       ;get a zero
        adc     a, [b]                  ; and add in the carry and clear it
        x       a, [b-]                 ; and save
        drsz    cnt
        jp      avloop ld      cnt, #3                 ;setup for the shift operation
        ld      a, [b+]                 ;increment b to point to avwork+1
sftlop:
        ld      a, [b]                  ;it's more efficient to do it always
        rrc     a                       ; rather than a test and skip
        x       a, [b-]                 ;restore the shifted value
        ld      a, [b]                  ;now get the LSB
        rrc     a                       ; and shift it as well
        x       a, [b+]
        drsz    cnt
        jp      sftlop                  ;three times for divide by 8 ld      a, [b-]                 ;point back to avwork
```

APPENDIX A

```
            ld      a, [b]                  ;get the average value for return
            ret ; WRITAD returns the A/D values starting at 1F81h
;
;           1F81 - Bank A voltage
;           1F82 - Bank A charge current
;           1F83 - Bank B voltage
;           1F84 - Bank B charge current
;           1F85 - Reserve battery voltage
;           1F86 - Reserve battery discharge current
;           1F87 - Bank A discharge current
;           1F88 - Bank B discharge current writad:
            ld      b, #ophigh
            clrbit  iom, [b]                ;make sure we're set to memory cycle
            jsr     puthi ld      b, #transb+7            ;point to the data
            ld      x, #portd writ8p:                                     ;write the parameters to SRAM
            ld      a, [b-]                 ;get the last parameter
            x       a, [x]
            except  sramw 01F88             ; and write in reverse order
            ld      a, [b-]
            x       a, [x]
            except  sramw 01F87
            ld      a, [b-]
            x       a, [x]
            except  sramw 01F86
            ld      a, [b-]
            x       a, [x]
            except  sramw 01F85
writ4p:
            ld      a, [b-]
            x       a, [x]
            except  sramw 01F84
            ld      a, [b-]
            x       a, [x]
            except  sramw 01F83
            ld      a, [b-]
            x       a, [x]
            except  sramw 01F82
            ld      a, [b]
            x       a, [x]
            except  sramw 01F81
            ret t1off:
            ld      b, #portgd
            clrbit  txc0, cntrl             ;turn off timer
            setbit  chrgb, [b]              ; then make sure output is high
```

APPENDIX A

```
         ld      b, #tmr1lo              ;clear out the timer to avoid
         ld      [b+], #0                ; phase shifts
         ld      [b], #0
         ret t2off:
         ld      b, #portld
         clrbit  txc0, t2cntrl           ;turn off timer
         setbit  chrga, [b]              ; then make sure output is high
         ld      b, #tmr2lo              ;clear out the timer to avoid
         ld      [b+], #0                ; phase shifts
         ld      [b], #0
         ld      b, #ophigh              ;make sure the speaker is also off
         clrbit  speakr, [b]
         jmp     puthi rbcend:
         clrbit  chrgrb, crgmde
rbcoff:
         ld      b, #oplow               ;point to OP low save byte
         clrbit  chrgrb, [b]             ;turn off the Res batt charger
         jmp     putlow rbstrt:
         ld      b, #ophigh
         clrbit  iom, [b]                ;make sure we're set to memory cycle
         jsr     puthi
         ld      a, #L(srescr)           ;get # of times reserve has been charged
         jsrl    m1e00
         inc     a
         x       a, portd
         except  sramw, srescr           ;save the count
         ifeq    portd, #0               ;did we wrap
         jsr     incrcr                  ;then increment upper byte
         setbit  chrgrb, crgmde
         jsrl    clrold
         ld      brvmax, #0              ;clear peak reading
rbcon:
         bitif   trklec, crgmde          ;true if trickle charge active
         jsrl    trklof                  ; turn off trickle charge
         ld      b, #oplow
         setbit  chrgrb, [b]             ;turn on the reserve batt charger
         jmp     putlow incrcr:
         ld      a, #L(srescr+1)         ;get # of times reserve has been charged
         jsrl    m1e00
         inc     a
         x       a, portd
         except  sramw, srescr+1         ;save the count
         ret incrti:
         ld      a, #L(sresti)           ;reserve operation time
```

APPENDIX A

```
        jsrl    m1e00
        ifgt    a, #min+            ;max time
        ret
        inc     a
        x       a, portd
        except  sramw, sresti       ;save the new time
        ret wait50:
        nop                         ;40 clocks + 9 for this subroutine
        nop                         ; +14 cycles added for 80h period
        nop
        nop
        nop
        jsr     delay1
        jsr     delay1
        jsr     delay1
        jsr     delay1
        jmp     delay1

; ROTATE stores the last 8 values in an array pointed to by the B register
; these values are used to calculate average voltage and current for the
; battery charge function
;
;       On Entry:
;               A - contains the most recient value read by the A/D
;               B - points to the beginning of the 8 byte array
;       On Exit:
;               A - contains value being discarded
;               B - points to start of the next array rotate:
        x       a, [b+]             ;Store and increment
        x       a, [b+]
        x       a, [b+]
        x       a, [b+]
        x       a, [b+]
        x       a, [b+]
        x       a, [b+]
        x       a, [b+]
        ret adjv:
        ld      x, #transb+6        ;point to discharge current
        ld      b, #transb          ;point to voltage reading
        bitif   bankb, oplow        ;what bank are we on?
        jsr     incptr
        ld      a, [x]              ;get the current
        sc                          ; prepare for subtract
        ifgt    a, #avcur           ;if current greater than normal
        jp      adjvup              ; then reduce the apparent voltage
        x       a, avwork           ;save the current
        ld      a, #(avcur+15)      ;for rounding
        subc    a, avwork
```

APPENDIX A

```
            jsr     div32
            x       a, [b]
            sc
            subc    a, [b]              ;increase the apparent delta
            jp      adjext
adjvup:
            subc    a, #(avcur-15)      ;adjust for rounding
            jsr     div32               ; and divide by 32
            add     a, [b]              ;increase the apparent voltage
adjext:
            x       a, [b]              ;store the adjusted voltage
            ret incptr:
            ld      a, [b+]             ;increment b by 2
            ld      a, [b+]
            ld      a, [x+]             ;and x by 1
            ret div32:
            ld      cnt, #5             ;shift right by 5
div32a:
            rc
            rrc     a
            drsz    cnt
            jp      div32a
            ret tstnmh:
            ifeq    tdelay, #0          ;test new battery delay
            jp      tstn0a
            jmp     adj00               ;wait for opamps to stabilize
tstn0a:
            clrbit  crgdly, mode        ;so we don't do this again
            jsr     avrage              ;compute the new averages
            ld      batcnt, #mxctim     ;max charge time = 2.75 hours for nicad
            clrbit  nihdet, batmsc      ;set NiCd to start .if     nimh
            ld      a, battmp           ;get the averaged battery temperature
            ifgt    a, #4               ;to allow for A/D offset
            jp      tstnh0
            .endif jmp     adj00a              ;if 0 we have NiCd
tstnh0:
            ld      batcnt, #mxniht     ;3.75 hours max for metal hydride
            setbit  nihdet, batmsc      ;set NiMH detected flag
            ifgt    a, #hiniht
            jp      crgoff              ;don't charge hot battery
            ifgt    a, #loniht
            jmp     adj00a              ;only charge if above minimum temp
            jp      crgoff
```

APPENDIX A

```
tsthot:
        ifgt    a, #maxnih          ;is battery too hot?
        jp      crgoff              ;then stop charge
        jmp     adj00 crgoff:
        clrbit  chrga, crgmde       ;tell system we are done
        clrbit  chrgb, crgmde       ;tell system we are done
        jsr     t2off               ;turn off the timer
        jsr     t1off               ;turn off the timer
        clrbit  chrga, portlc       ; and timer A output bit
        clrbit  chrgb, portgc       ; and the B output bit
        clrbit  charge, crgmde      ; reset mode
        setbit  crgled, portcd      ;turn off the charge led
        ret adjcrg:
        jsrl    adjnois             ;check for noise and adjust the averages accordingly
        bitif   nimhd, portcp       ;test battery contact
        jp      adj000
        jp      crgoff              ;don't allow NIMH bat to charge
adj000:
        ld      a, battmp           ;get the battery temperature
        bitif   crgdly, mode        ;is this the first adjust cycle
        jmp     tstnmh              ; then check for NiMH battery
adj00a:
        .if     nimh
        bitif   nihdet, batmsc      ;is this a NiMH batery?
        jmp     tsthot              ;then check for temp rise
        ifgt    a, #4               ;if here we think this is a NiCd
        jmp     crgoff              ; but it was a very cold NiMH
        .endif
adj00:
        bitif   trklec, crgmde      ;are we trickle charging?
        ret                         ; if so just return
        drsz    syscnt              ;only adjust every 8 seconds
        ret
        bitif   act, debug
        jsrl    snap                ;take snapshot of system
        ld      syscnt, #8
        jsr     avrage              ;compute the new averages
        bitif   chrga, crgmde
        jsr     testa
        bitif   chrgb, crgmde
        jsr     testb
        jsr     dspdc               ;display duty cycle on smartview
        ret adja:
        ifgt    a, bavmin           ;try to bring current back to equal
        jp      testa0              ; or slightly greater than it was
        ifeq    a, bavmin           ; before other bank cut off
        jp      testa0
        jp      testa1              ;increment PWM
```

APPENDIX A

```
testa:
        ld      a. bacrg
        bitif   camax. crgmde
        jp      adja testa0:
        ifgt    a. #ihchrg              :compare with desired charge rate
        jp      shortt                  : if greater test for short
        bitif   nihdet. batmsc          :is this a NiMH battery
        jp      ta0mhd
        ifgt    a. #(ilchrg-11)         :is charge rate correct (for NiCd battery)?
        jmp     ashort                  : yes. then test for shorted cell
        jp      testa1
ta0mhd:
        ifgt    a. #ilchrg              :is charge rate correct?
        jmp     ashort                  : yes. then test for shorted cell testa1:
        ld      b. #t2ralo              :point to timer 2 a reg
        ld      a. [b]                  : and get current setting
        ifeq    a. #(maxcrg-2)          :are we already at maximum: don't allow 100% duty cycle
        ret                             : then stay put
        inc     a                       :bump the charge rate
        x       a. [b+]
        ld      a. [b+]                 :increment to the b register
        ld      a. [b]                  : and get the current setting
        dec     a                       :decrement by one
        x       a. [b]                  : and store it back
        ld      hdcnt. #3               :force new minimum current
        setbit  apwmup. batmsc          :last operation was increment
        ret shortt:                                 :test for shorted battery
        ld      a. #v2cell              :check voltage
        bitif   nihdet. batmsc          :is this an NiMH battery?
        ld      a. #v2cnmh              : then use a lower voltage
        ifgt    a. batav                :is voltage nominal
        jmp     acrgof                  :battery is shorted if less than 8.0v
        ld      b. #t2ralo              :if not then reduce charge
        ld      a. [b]
        ifgt    a. #mincrg              :are we above the minimum
        jp      short1
        jmp     acrgof                  :if not then turn off ashort:
        ld      a. batav                :get the current voltage
        bitif   nihdet. batmsc          :is this an NiMH battery?
        jp      ahshrt                  : then do test at lower threshold
        ifgt    a. #v2cell              :test against minimum voltage
        ret                             :if OK
        jmp     acrgof                  :otherwise turn off charge ahshrt:
```

APPENDIX A

```
         ifgt    a, #v2cnmh              ;test against minimum voltage
         ret                             ;if OK
         jmp     acrgof                  ;otherwise turn off charge short1:
         dec     a
         x       a, [b+]                 ;decrease the on time
         ld      a, [b+]
         ld      a, [b]
         inc     a                       ; and increase the off time
         x       a, [b]
         ld      hdcnt, #2               ;wait before next check for -dV
         clrbit  apwmup, batmsc          ;last operation was decrement
         ret deca0:
         ld      b, #t2ralo              ;to then reduce charge
         ld      a, [b]
         ifgt    a, #mincrg              ;are we above the minimum
         jp      short1
         ret                             ;if not just return adjb:
         ifgt    a, bbvmin               ;try to bring current back to equal
         jp      testb0                  ; or slightly greater than it was
         ifeq    a, bavmin               ; before other bank cut off
         jp      testb0
         jp      testb1                  ;increment PWM testb:
         ld      a, bbcrg
         bitif   cbmax, crgmde
         jp      adjb testb0:
         ifgt    a, #ihchrg              ;compare with desired charge rate
         jmp     shortb                  ; if greater test for short
         bitif   nihdet, batmsc          ;is this a NiMH battery
         jp      tb0mhd
         ifgt    a, #(ilchrg-11)         ;is charge rate correct (for NiCd battery)?
         jmp     bshort                  ; yes, then test for shorted cell
         jp      testb1
tb0mhd:
         ifgt    a, #ilchrg              ;is charge rate correct?
         jmp     bshort                  ; yes, then test for shorted cell testb1:
         ld      b, #t1ralo              ;point to timer 2 a reg
         ld      a, [b]                  ; and get current setting
         ifeq    a, #(maxcrg-2)          ;are we already at maximum, don't allow 100% duty cycle
         ret                             ; then keep constant rate
         inc     a                       ;bump the charge rate
         x       a, [b]                  ; and store it back
         ld      b, #t1rblo              ;point to the b register
```

APPENDIX A

```
            ld      a, [b]                  ; and get the current setting
            dec     a                       ; decrement by one
            x       a, [b]                  ; and store it back
            ld      lcdcnt, #3
            setbit  bpwmup, batmsc          ;last operation was increment
            ret shortb:                                     ;test for shorted battery
            ld      a, #v2cell              ;check voltage
            bitif   nihdet, batmsc          ;is this an NiMH battery?
            ld      a, #v2cnmh              ; then use a lower voltage
            ifgt    a, batbv                ;is voltage nominal
            jmp     bcrgof                  ;battery is shorted if less than 7.5v
            ld      b, #t1ralo              ;if not then reduce charge
            ld      a, [b]
            ifgt    a, #mincrg              ;are we above the minimum
            jp      short2
            jmp     bcrgof                  ;if not then turn off bshort:
            ld      a, batbv                ;get the current voltage
            bitif   nihdet, batmsc          ;is this an NiMH battery?
            jp      bhshrt                  ; then do test at lower threshold
            ifgt    a, #v2cell              ;test against minimum voltage
            ret                             ;if OK
            jmp     bcrgof                  ;otherwise turn off charge bhshrt:
            ifgt    a, #v2cnmh              ;test against minimum voltage
            ret                             ;if OK
            jmp     acrgof                  ;otherwise turn off charge short2:
            dec     a
            x       a, [b]                  ;decrease the on time
            ld      b, #t1rblo
            ld      a, [b]
            inc     a                       ; and increase the off time
            x       a, [b]
            ld      lcdcnt, #2
            clrbit  bpwmup, batmsc          ;last operation was decrement
            ret decb0:
            ld      b, #t1ralo              ;to then reduce charge
            ld      a, [b]
            ifgt    a, #mincrg              ;are we above the minimum
            jp      short2
            ret                             ;if not just return tstend:
            bitif   cet, debug
            jsrl    snap                    ;take snapshot of system
            drsz    batcnt                  ;Maximum charge time
```

APPENDIX A

```
            jp      tst00
            jsr     tst01           ;continue to monitor reserve battery
            jmpl    trickl          ;trickle charge
tst00:
            bitif   chrga, crgmde
            jsr     testav
            bitif   chrgb, crgmde
            jsr     testbv
tst01:
            bitif   chrgrb, crgmde
            jmp     testrv
            ret setvma:
            ifgt    a, [b]
            ld      avcnst, #cvtimr
            ifgt    a, [b]
            x       a, [b]          ;store most recent voltage as new max
            jp      vacnst tstav0:
            x       a, [b]          ;store new maximum
            ld      avcnst, #cvtimr ;voltage changed so reset timer
            jmp     testac    ;**   ;test if current is increasing also
;**         ret testav:
            ld      a, batav        ;get new average
            ld      b, #bavmax
            bitif   apwmup, batmsc  ;did we adjust up or down
            jp      tstav1          ; if adj up
            drsz    hdcnt           ;no -dV after -dPulse width
            jp      setvma
            ld      hdcnt, #1
tstav1:
            ifgt    a, [b]
            jp      tstav0          ;set new maximum value
            ifeq    a, [b]          ;are we at a plateu
            jp      vacnst          ; test for timeout
            rc
            adc     a, #deltav      ;add in the delta for comparison
            ifgt    a, [b]          ;look for -dV
            jp      vacnst
            jp      acrgof          ; then turn off vacnst:
            drsz    avcnst          ;decrement counter
            jmp     testac acrgof:
            clrbit  chrga, crgmde   ;tell system we are done
            jsr     t2off           ;turn off the timer
            clrbit  chrga, portc    ; and timer output bit
            bitif   chrgb, crgmde   ;is bank B still charging
```

APPENDIX A

```
            jp      stepb2              ;adjust the bank B pwm
            jmpl    trickl stepb:
            ifeq    lcdcnt. #1
            jp      stepb1              ;if 1 then we have not changed pwm recently
            jp      stepb2              ; otherwise we just bumped it
stepb1:
            ld      a. bbvmax           ;get the peak voltage on B
            ld      b. #batbv           ;and the present reading
            ifgt    a. [b]              ;has voltage dropped?
            jmp     bcrgof              ; then turn off B as well
            ld      a. bbcrg            ; else check current
            ld      b. #bbimin          ; for an increase
            ifgt    a. [b]              ; of even 1 unit
            jmp     bcrgof              ; and turn off
stepb2:
            setbit  cbmax. crgmde
            ld      a. bbcrg            ;get the present current value
            x       a. bbvmin           ;and save it so we can adjust pwm
            jsr     decb0
            jsr     decb0
            jsr     decb0
            jsr     decb0
            jsr     decb0
            ld      a. #ilchrg-75       ;if voltage still ramping up then
            ifgt    a. bbcrg            ;only step back half way
            ret
            jsr     decb0
            jsr     decb0
            jsr     decb0
            jsr     decb0
            jmp     decb0 testac:
            ld      a. bacrg            ;check the current reading
            ld      b. #baimin          ; and compare with old average
            bitif   apwmup. batmsc      ;did we adjust up
            jp      tstacr              ;then test for delay
            jp      tstaca
tstacr:
            drsz    hdcnt
            jmp     setima              ;set new minimum
            ld      hdcnt. #1
tstaca:
            ifgt    a. [b]              ;is I increasing
            jp      tstac1              ; then test limits
tstac0:
            x       a. [b]              ;save new minimum if I not increasing
            ret tstac1:
            sc                          ;clear borrow for subtraction
            subc    a. [b]              ;find the delta I
```

APPENDIX A

```
         ifgt    a, #deltai              ; cutoff if +dI > 8ma.
         jp      tstac2
         ret
tstac2:  ld      a, batav
         .if     nimh
         bitif   nihdet, batmsc          ;is this a NiMH battery
         jp      tacmhd
         .endif
         ifgt    a, #(fulcrg+10)         ;make sure that it's not a false end of charge
         jmp     acrgof                  ;the extra 10 is for NiCd
         ret                             ;false alarm
tacmhd:                                  ;NiMhd full charge test
         .if     nimh
         ifgt    a, #fulcrg              ;make sure that it's not a false end of charge
         jp      tacmht                  ;check delta Temp.
         ret
tacmht:  jsrl    getemp                  ;returns the temperature in A
         ifgt    a, initemp              ;did we reach delta T
         jmp     acrgof
         ret                             ;false alarm
         .endif setima:
         x       a, [b]                  ; and set new minimum
         clrbit  camax, crgmde
         ret setvmb:
         ifgt    a, [b]
         ld      bvcnst, #cvtimr
         ifgt    a, [b]
         x       a, [b]                  ; store as new max
         jp      vbcnst tstbv0:
         x       a, [b]                  ;store potential new maximum
         ld      bvcnst, #cvtimr         ;voltage changed so reset timer
         jmp     testbc          ;**    ;test if current is increasing also
;**      ret testbv:
         ld      a, batbv        ;get new average
         ld      b, #bbvmax
         bitif   bpwmup, batmsc
         jp      tstbv1
         drsz    lcdcnt
         jp      setvmb
         ld      lcdcnt, #1
tstbv1:
         ifgt    a, [b]
         jp      tstbv0
         ifeq    a, [b]                  ;are we at a plateu
         jp      vbcnst                  ; test for timeout
         rc
```

APPENDIX A

```
         adc    a, #deltav
         ifgt   a, [b]              ;look for -dV
         jp     vbcnst
         jp     bcrgof              ; then turn off vbcnst:
         drsz   bvcnst              ;decrement counter
         jmp    testbc bcrgof:
         clrbit chrgb, crgmde       ;tell system we are done
         jsr    t1off               ;turn off the timer
         clrbit chrgb, portgc       ; and the output bit
         bitif  chrga, crgmde       ;is bank A still charging
         jp     stepa2              ;adjust the bank A pwm
         jmpl   trickl stepa:
         ifeq   hdcnt, #1
         jp     stepa1              ;if 1 then we have not changed pwm recently
         jp     stepa2              ; otherwise we just bumped it
stepa1:
         ld     a, bavmax           ;get the peak voltage on A
         ld     b, #batav           ;and the present reading
         ifgt   a, [b]              ;has voltage dropped?
         jmp    acrgof              ; then turn off A as well
         ld     a, bacrg            ; else check current
         ld     b, #baimin          ; for an increase
         ifgt   a, [b]              ; of even 1 unit
         jmp    acrgof              ; and turn off
stepa2:
         setbit camax, crgmde
         ld     a, bacrg            ;get the present current value
         x      a, bavmin           ;and save it so we can adjust pwm
         jsr    deca0
         jsr    deca0
         jsr    deca0
         jsr    deca0
         jsr    deca0
         ld     a, #ilchrg-75       ;if still ramping up current
         ifgt   a, bacrg
         ret
         jsr    deca0
         jsr    deca0
         jsr    deca0
         jsr    deca0
         jmp    deca0 testbc:
         ld     a, bbcrg            ;check the current reading
         ld     b, #bbimin          ; and compare with old average
         bitif  bpwmup, batmsc
         jp     tstbcr
         jp     tstbca
```

APPENDIX A

```
tstbcr:
        drsz    lcdcnt
        jmp     setimb
        ld      lcdcnt, #1
tstbca:
        ifgt    a, [b]                  ;is I increasing
        jp      tstbc1
tstbc0:
        x       a, [b]
        ret tstbc1:
        sc
        subc    a, [b]
        ifgt    a, #deltai
        jp      tstbc2
        ret
tstbc2: ld      a, batbv
        .if     nimh
        bitif   nihdet, batmsc          ;is this a NiMH battery
        jp      tbcmhd
        .endif
        ifgt    a, #(fulcrg+10)         ;make sure that it's not a false end of charge
        jmp     bcrgof                  ;the extra 10 is for NiCd
        ret                             ;false alarm
tbcmhd:                                 ;NiMhd full charge test
        .if     nimh
        ifgt    a, #fulcrg              ;make sure that it's not a false end of charge
        jp      tbcmht                  ;check delta Temp.
        ret
tbcmht: jsrl    getemp                  ;returns the temperature in A
        ifgt    a, initemp              ;did we reach delta T
        jmp     bcrgof                  ; then turn off charge
        ret
        .endif setimb:
        x       a, [b]                  ; and use as new minimum
        clrbit  cbmax, crgmde
        ret tstrcs:
        jsr     avrage                  ;compute average voltage testrv:
:       jsr     dsprv                   ;**    Display V on smartview
        ld      a, batrv                ;get most recent reading
        ifeq    a, #0FF                 ;Maximum possible voltage?
        jmp     rbcend                  ; indicates error so turn off charger
        ld      b, #brvmax              ;point to stored maximum
        x       a, [b]                  ; save new maximum?
        ifgt    a, [b]                  ;has V decreased
        jp      rbcext                  ; then turn off charge
        ret                             ; otherwise just return
```

APPENDIX A

```
rbcext:
        ld      b, #ophigh
        clrbit  iom, [b]          ;make sure we're set to memory cycle
        jsr     puthi
        ld      portd, #0
        except  sramw, sresti     ;reset reserve usage time
        jmp     rbcend dspcg:
        ld      a, portcd         ;port c data
        jsr     makhex
        jsr     smrtlo            ;output to lower 2 bytes
        ld      a, portgp         ; and port g data
        jsr     makhex
        jmp     smrthi            ;upper 2 bytes dspsp:
        ld      a, sp             ;stack pointer
        jsr     makhex
        jsr     smrtlo            ;output to lower 2 bytes
        ld      b, #avwork
        ld      [b+], #070        ;'p'
        ld      [b], #073         ;'s'
        jmp     smrthi            ;upper 2 bytes dsprv:
        ld      a, batrv
        jsr     makhex
        jsr     smrtlo            ;output to lower 2 bytes
        ld      a, brvmax
        jsr     makhex
        jmp     smrthi            ;upper 2 bytes dspdc:
        ld      a, t1ralo         ;on time for bank b
        jsr     makhex
        jsr     smrtlo            ;output to lower 2 bytes
        ld      a, t2ralo         ;on time for bank a
        jsr     makhex
        jmp     smrthi            ;upper 2 bytes makhex:
        ld      b, #avwork        ;point to temp area
        push    a
        jsr     hexnbl            ;convert to hex
        pop     a                 ;recover original value
        swap    a                 ; and reverse nibbles hexnbl:
        and     a, #0F            ;mask off upper nibble
        add     a, #030
        ifgt    a, #039
```

APPENDIX A

```
        add     a, #07
        x       a, [b+]
        ret
```

;This is a debug routine to write values to smart view on the host processor bus ; The X register is used to point to the Data to be output
; The B register points to Port D during the data transfer smrtlo:
; first set IO_M~ to IO in OPH
```
        ld      b, #ophigh              ;point to the op register data storage
        setbit  iom, [b]                ; D port data = 10000000 for IO
        jsr     puthi ld      x, #avwork              ;pointer for data to be output
```

; next, set up DRQ5 in OPL
```
        ld      a, oplow                ;get the op register data
        x       a, portd                ; so we can retreive this later
        ld      a, portd                ; emulate a store instruction
        or      a, #drq5                ;set the drq5 bit in the register save data
        x       a, portd                ; D port data = 00000001 for DRQ5
        ld      b, #portcd
        clrbit  milsad, [b]             ; C0 = 0
        setbit  milstb, [b]             ; C1 = 1 (this starts the DREQ cycle)
```

; now look for DACK

```
        ckdack
```

; next, pull master high in OPL
```
        ld      b, #portd               ; point to the D port
        setbit  master, [b]             ; D port data = 00000011 for master*
        clrbit  milstb, portcd          ; close the OP Low register
```

; write desired data to D port
```
        x       a, [x+]                 ;recover the data to output
        x       a, [b]                  ; and store it in port D
```

; execute the io write exception cycle to port 94h
```
        except  iow, 094 x       a, [x]                  ;get the next byte to output
        x       a, [b]                  ; and put it in port D
```

; execute the io write exception cycle to port 95h
```
        except  iow, 095
```

; clear DRQ and master*
```
        ld      a, oplow
        x       a, [b]                  ; A contains the original OP Low value
        ld      b, #portcd              ; point back to port C
        setbit  milstb, [b]             ; turn off master mode
```

APPENDIX A

```
        clrbit    milstb, [b]

; now set IO_M~ to M in OPH
        ld        b, #ophigh              ;point to the op register data storage
        clrbit    iom, [b]                ;point to memory
        jmp       puthi                   ; and return ;This is a debug routine to write values to smart view on the host processor bus ; The X register is used to point to the Data to be output
; The B register points to Port D during the data transfer smrthi:
; first set IO_M~ to IO in OPH
        ld        b, #ophigh              ;point to the op register data storage
        setbit    iom, [b]                ; D port data = 10000000 for IO
        jsr       puthi ld        x, #avwork              ;pointer for data to be output ; next, set up DRQ5 in OPL
        ld        a, oplow                ;get the op register data
        x         a, portd                ; so we can retreive this later
        ld        a, portd                ; emulate a store instruction
        or        a, #drq5                ;set the drq5 bit in the register save data
        x         a, portd                ; D port data = 00000001 for DRQ5
        ld        b, #portcd
        clrbit    milsad, [b]             ; C0 = 0
        setbit    milstb, [b]             ; C1 = 1 (this starts the DREQ cycle)

; now look for DACK ckdack

; next, pull master high in OPL
        ld        b, #portd               ; point to the D port
        setbit    master, [b]             ; D port data = 00000011 for master*
        clrbit    milstb, portcd          ; close the OP Low register ; write desired data to D port
        x         a, [x+]                 ;recover the data to output
        x         a, [b]                  ; and store it in port D ; execute the io write exception cycle to port 96h
        except    iow, 096 x         a, [x]                  ;get the next byte to output
        x         a, [b]                  ; and put it in port D ; execute the io write exception cycle to port 97h
        except    iow, 097

; clear DRQ and master*
        ld        a, oplow
```

APPENDIX A

```
        x       a, [b]                  ; A contains the original OP Low value
        ld      b, #portcd              ; point back to port C
        setbit  milstb, [b]             ; turn off master mode
        clrbit  milstb, [b]

; now set IO_M~ to M in OPH
        ld      b, #ophigh              ;point to the op register data storage
        clrbit  iom, [b]                ;point to memory
        jmp     puthi                   ; and return ; SHRTON will drop master for a short period of time to allow the cpu to
; service the timer interrupt in order to maintain the DOS/UNIX clock shrton:
        clrbit  cpuint, wkpnd           ;clear the interrupt bit
        bitif   drq5, oplow             ;are we in hold currently
        jp      shrt00                  ; if so then turn on for a short time
        ret                             ; otherwise just return
shrt00:

; set IO_M~ to IO in OPH ld      b, #ophigh              ;point to the op register data storage
        setbit  iom, [b]                ; D port data = 10000000 for IO
:       setbit  pd9020, [b]             ;turn on 90C20
        jsr     puthi ld      b, #oplow
        clrbit  drq5, [b]               ;drop DRQ5
        clrbit  master, [b]             ; and master
        jsr     putlow                  ;for a short time
        ld      b, #portlp              ;point to the L port
onloop:
        bitif   cpuint, [b]             ;wait for the interrupt to be serviced
        jp      onloop                  ; by the host cpu jsr     delay                   ; give cpu time to complete interrupt
        ld      b, #oplow
        setbit  drq5, [b]               ;now lets reassert drq, etc
        ld      a, [b]                  ;get the op register data
        x       a, portd                ;and write to port d
        setbit  master, [b]             ; set flag while we still point there
        ld      b, #portcd
        clrbit  milsad, [b]             ; C0 = 0
        setbit  milstb, [b]             ; C1 = 1 (this starts the DREQ cycle)

; now look for DACK ckdack

; next, pull master high in OPL
```

APPENDIX A

```
            ld      b, #pord            ; point to the D port
            setbit  master, [b]         ; D port data = 00000011 for master
            clrbit  milstb, portcd      ; close the OP Low register
; now set IO_M- to M in OPH
            ld      b, #ophigh          ;point to the op register data storage
            clrbit  iom, [b]            ;point to memory
;           bitif   crton, flashb       ;are we using the crt
;           jp      shrt01              ; then don't turn video off
;           clrbit  pd9020, [b]         ;turn off 90C20
;shrt01:
            jmp     puthi               ; and return ; SPMOFF outputs a active high pulse to kill the system power module.
; This routine does not return, it just loops waiting for power to go away spmoff:
            jsrl    stndby              ;put system in lowest power mode
            jsrl    kildsp              ;force the display off without sequencing
            ld      psw, #0             ;Stop all interrupts
            ld      b, #oplow
            ld      a, [b]              ;get the current settings
            and     a, #bankb+drq5+master    ;mask off led and reserve charger
            x       a, [b]              ;and write it out
            jsr     putlow
            ld      b, #ophigh
            clrbit  dcoff, [b]          ;Start low
            jsr     puthi ; COPOFF turns off the COP by forcing a watchdog error copoff:
            ld      b, #ophigh
            ld      [b], #0             ;clear all bits
            setbit  fetoff, [b]         ;make sure FET is off
            setbit  dcoff, [b]          ;make sure power off bit is high
            jsr     puthi               ;This is to get around powerup
                                        ; problem with MILES
            ld      b, #oplow
            ld      a, [b]              ;get the current settings
            and     a, #bankb+drq5+master    ;mask off led and reserve charger
            x       a, [b]              ;and write it out
            jsr     putlow
            setbit  rbin, portcd        ;turn off the reserve battery
            ld      portcc, #0          ;tri-state all outputs
            ld      portcd, #0
            ld      portlc, #0
            ld      portld, #0
            ld      portgc, #0
            ld      portgd, #0
;           ld      cnt, #50            ;minimum of 250msec delay
;           rbit    5, icntrl           ;clear the T0 overflow bit
;           jsr     dely5a               ;wait for power to go away
            ld      wdcnt, #0           ;invalid data for watchdog to force reset
```

APPENDIX A

```
                jp      .                       ;wait for power to go away
:tstflh:                        ;** DEBUG **
;               ld      b, #oplow
;               jsr     fllbat
;               jsr     dely50
;               jp      tstflh
:fllbat:
;               bitif   lowbat, [b]
;               jmp     lbloff
;               jmp     lblon ; Routine to switch batteries every 4 minutes and
; then reset idle count down timer. Skips next instruction
; after returning if operation is successful
;
cngbat:
                ld      a, batcnt       ;how long did we use the previous bank
                ifgt    a, #min1*3      ; less than 1 minute?
                ret                     ;   then do error return
                ld      batcnt, #min4   ;**
                jsrl    tstbat          ;make sure other bank is good
                ret
cngalt:
                bitif   initdc, batmsc  ;is this the first bank switch
                ld      batcnt, #min4/2 ; first use is 2 minutes for second bank
                clrbit  initdc, batmsc  ; then clear the flag to return to 4 min.
                setbit  cngben, batmsc  ;enable change on next timer tick
                setbit  blinkc, flashb  ;enable reserve for one more timer tick
                bitif   chrgrb, crgmde  ;Is reserve battery being charged?
                jsrl    rbcoff          ;turn it off before enabling Rbat
                clrbit  rbin, portcd    ;turn on reserve battery
                clrbit  bdt, wken       ;disable battery detect interrupt
                ld      tdelay, #5      ;1 sec delay before battery test
                retsk                   ;pretend we're done docngb:
                bitif   blinkc, flashb
                jp      dlycng
                setbit  blinkc, flashb  ;enable reserve for one more timer tick
                setbit  cngoff, batmsc  ;enable reserve off on next timer tick
                clrbit  cngben, batmsc  ; and don't switch again for a while
cngbnk:
                ld      b, #oplow       ;point to the op register data storage
                ld      a, #bankb       ;set bit to invert
                xor     a, [b]          ;invert it
                x       a, [b]          ;and store the new value
                jmp     putlow          ;set the byte in the MILES OP register dlycng:
                clrbit  blinkc, flashb  ;extra 5.12 msec.
                ret reseta:
```

APPENDIX A

```
        ld      a, batav
        x       a, bavmax       ;reset maximum on A
        ret resoff:
        bitif   blinkc, flashb
        jp      dlycng
resof0:
        clrbit  cngoff, batmsc  ;so we won't come here again
        jsr     clrbdt          ;reset the battery detect latch
        bitif   bdt, portlp     ;then check to see if battery really present
        jp      nobat           ;if battery just removed
        setbit  rbin, portcd    ;if good then turn off the reserve
        bitif   chrgrb, crgmde  ;was the reserve battery charging before bank switching
        jsrl    rbcon
        setbit  bdt, wken       ; and reenable the bdt interrupt
        bitif   bankb, oplow    ;check for current bank
        jp      reseta
        ld      a, batbv
        x       a, bbvmax       ;reset maximum on B
        ret nobat:
        clrbit  nihdet, batmsc  ;clear the NiMH bit for new battery
        setbit  bdt, wkpnd      ;make sure interrupt is active
        setbit  bdt, wken       ; and reenable the bdt interrupt
        ret                     ; then continue delay:
        ld      cnt, #180       ;approx 3.6 msec delay
dellop:
        jsr     delay1          ; 20usec/loop at 8MHz
        drsz    cnt
        jp      dellop
        ret delay1:
        ret dely50:
        ld      cnt, #20 :**10  ;minimum of 51msec delay
        rbit    tpnd, icntrl    ;clear the T0 overflow bit
dely5a:
        ifbit   tpnd, icntrl    ;require 1 full idle period to start
        jp      dely51          ; before servicing watchdog
        jp      dely5a          ;loop
dely51:
        rbit    tpnd, icntrl    ;clear the T0 overflow bit
dely52:
        ifbit   tpnd, icntrl    ;wait for it to be set again
        jp      dely53
        jp      dely52          ;loop
dely53:
```

APPENDIX A

```
        ld      wdcnt, #wdval       ;service watch dog 2-65K window, clock monitor on
        drsz    cnt                 ;10 timer overflows
        jp      dely51              ;wait another 5.12msec
        ret locate  0B,-1               ;make sure there is no overlap .=0C00                      ; SRAM address for ports 02 - FFh
```

; This routine will allow the COP to read I/O ports between it's ending
; address and 0FFh. The routine is called with A = L(port address)

ior000:
```
        laid                        ;read data out of SRAM
        ret .=0D00                      ; SRAM address for ports 102 - 1FFh
```

; This routine will allow the COP to read I/O ports between it's ending
; address and 01FFh. The routine is called with A = L(port address)

ior100:
```
        laid                        ;read data out of SRAM
        ret .=0E00                      ; SRAM address for ports 202 - 2FFh
```

; This routine will allow the COP to read I/O ports between it's ending
; address and 02FFh. The routine is called with A = L(port address)

ior200:
```
        laid                        ;read data out of SRAM
        ret .=0F00                      ; SRAM address for ports 302 - 3FFh
```

; This routine will allow the COP to read I/O ports between it's ending
; address and 03FFh. The routine is called with A = L(port address)

ior300:
```
        laid                        ;read data out of SRAM
        ret

.=01000
```

;
; External interrupt G0 interrupt vector
;
extirq:
```
        clrbit  pwrled, portcd      ;turn on power LED
        jsr     getcmd              ;read the command from SRAM
        jsr     dispch              ;decode and execute
```

APPENDIX A

```
        bitif    dlycdn. lcdseq      ;not yet finished with command
        jp       waitex              ; then exit without cdone
        ld       b. #ophigh
        clrbit   iom. [b]            ;make sure we're set to memory for CDONE
        jsrl     puthi
        rbit     ipnd. psw           ;reset external interrupt pending flag
        except   scdone. 0           ; set CDONE for the host
        jmpl     restor dispch:
        add      a. #L(tblbeg)
        ifgt     a. #L(tblend)
        jp       cmderr              ;invalid command
        jid waitex:
        rbit     1. psw              ; disable external interrupt
        jmpl     restor              ;to return to normal processing cmderr:
        ld       b. #ophigh
        clrbit   iom. [b]            ;make sure we're set to memory cycle
        jsrl     puthi ld       portd. #0ff         ;indicate command error
        except   sramw. 01f80        ;replace original command
        ret tblbeg:
        .addr    cksum               ; 0 - Checksum SRAM
        .addr    slftst              ; 1 - Initiate self test
        .addr    togbat              ; 2 - Switch batteries
        .addr    sbatA               ; 3 - Select battery A
        .addr    sbatB               ; 4 - Select battery B
        .addr    sbatR               ; 5 - Select reserve battery
        .addr    dsbatR              ; 6 - Deselect reserve battery
        .addr    dspon               ; 7 - Turn on backlight and display
        .addr    dspoff              ; 8 - Turn off backlight and display
        .addr    batst               ; 9 - Return battery status
        .addr    sleep               ; A - Enter sleep mode
        .addr    endslp              ; B - Exit sleep mode
        .addr    slwclk              ; C - Enter slow clock mode
        .addr    fstclk              ; D - Enter fast clock mode
        .addr    stndby              ; E - Enter standby mode
        .addr    pwrdwn              ; F - Turn off System Power Module
        .addr    acpchk              ;10 - Current AC power & switches check
        .addr    strtpm              ;11 - Start power management
        .addr    drvoff              ;12 - Put hard disk to sleep
        .addr    endpm               ;13 - Stop power management functions
        .addr    c20on               ;14 - Turn on the WD 90C20
        .addr    c20off              ;15 - Turn off the WD 90C20
        .addr    sysimg              ;16 - Image of cop Ram  0=immediate.
                                     ;                       1=crg end test
                                     ;                       2=adj crg
```

APPENDIX A

```
                                              ;              +=low bat test
        .addr    stchrg                       ;17 - Start a charge cycle for test
        .addr    outlow                       ;18 - Set state of OP Low bits
        .addr    outhi                        ;19 - Set state of OP High bits
        .addr    spwmt1                       ;1A - Set high/low timer 1
        .addr    spwmt2                       ;1B - Set high/low timer 2
        .addr    crgres                       ;1C - Charge reserve 0 = off/1 = on
        .addr    notrkc                       ;1D - Do not allow trickle 0 = trkl off
tblend:
        .addr    flash                        ;1E - 0 = turn off BDT and Standby. FET on for flash ; The following is the actual table of jumps to the various routines.
; This is a rather convoluted way of doing things, but this is the
; simplest indirect jump/dispatch method supported by the COP.
; This entire table starting from the JID instruction above must
; fit in the same 100H page of memory.

cksum:
        jmp      chksum slftst:
        ret
;       jmp      cmderr                       ;invalid command sbatA:
        setbit   bankb, oplow                 ;make system think it's on bank B
togbat:
        jsrl     cngalt                       ;force the change always
        jmp      cmderr
        ld       batcnt, #min4                ; and reset the timeout
        ret sbatB:
        clrbit   bankb, oplow                 ;make system think it's on bank A
        jp       togbat sbatR:
        clrbit   rbin, portcd                 ;turn on reserve battery
        ret dsbatR:
        setbit   rbin, portcd                 ;turn off reserve battery
        ret dspon:
        bitif    lcdon, oplow                 ;is the LCD already on?
        ret                                   ; then don't toggle pwrdwn
        setbit   dlycdn, lcdseq               ;force delay for operation
        jmpl     dsplon                       ;turn on display and backlight dspoff:
;**     setbit   dlycdn, lcdseq               ;force delay for operation
        jmpl     dsplof                       ;turn off the display & backlight
```

APPENDIX A

```
batst:
        jsrl    readad              ;read the A/D channels
;       jsrl    avrage              ;compute the average
        jmpl    writad              ;and return the instantaneous results sleep:
        setbit  slpmde, mode
        ld      a, #094  ;**0C4                 ;250KHz for 286
        bitif   s386, sysbyt        ;is it really a 386
        xor     a, #0    ;**50      ; if so switch to 2 MHz
        x       a, temp             ;set sleep mode register
        jsr     htctlw              ;write HT21 control and return
        clrbit  kbdint, wkpnd       ;Clear keyboard to start
        setbit  kbdint, wken        ;enable wakeup interrupt
        ret endslp:
        clrbit  slpmde, mode
        ld      temp, #014          ;turn off sleep mode
        jmp     htctlw              ;write HT21 control and return slwclk:
        jmpl    lspeed              ;set the processor speed to low fstclk:
        jmpl    hspeed              ;set the processor speed to high pwrdwn:
        jmpl    spmoff              ;turn off System Power Module acpchk:
        jmp     chkac strtpm:
        ld      cnt, #4             ;4 parameters currently
        jsr     gsparm              ; get the parameters
        jsr     xsump               ;checksum the parameters
        x       a, [x]              ; and store the checksum
        jmpl    stmout              ; then set the timeout values endpm:

jmp     cmderr              ;invalid command
chksum:
        jmp     chk1st              ;checkum 1st block of program stndby:
;**     jsr     chkact              ;see if system currently busy
        jsr     drvoff              ;turn off the drive
        jsrl    dspof0              ;turn off the display
;       bitif   crton, flashb       ;are we using the crt
;       jp      stnd00
        jsr     c20off              ;turn off the 90C20
```

APPENDIX A

```
stnd00:
        jsr     sleep                   ;slow the clock
        jsr     cpuhld                  ;lowest power mode
        ld      erc, #1                 ;setup to flash every two seconds
        ret sysimg:
        jmp     sysim0                  ;setup for ram snapshot stchrg:
        jmp     stcrg1 crgres:
        jsr     getlp
        ifeq    transb, #0
        jmpl    rbcend
        jmpl    rbstrt notrkc:
        jsr     getlp
        ifeq    transb, #0
        jmp     strflg
        clrbit  notrkl, mode            ;turn off trickle charge
        ret flash:
        jmp     flash0 outlow:
        jsr     getlp                   ; get 1 parameter from data area
        ld      a, transb               ; and store it in transb
        ld      b, #oplow
        x       a, [b]
        jmpl    putlow                  ; then output to OP Low and return outhi:
        jsr     getlp
        ld      a, transb
        ld      b, #ophigh
        x       a, [b]
        jmpl    puthi                   ; same as above to OP High spwmt1:
        jp      spwm1x spwmt2:
        jmp     spwm2x drvoff:
        jmp     drvof1 c20off:
        ld      b, #ophigh              ;point to op high byte
        clrbit  pd9020, [b]             ;turn off the 90C20
```

APPENDIX A

```
            jmpl     puthi              ; after the backlight and return c20on:
            ld       b, #ophigh         ;point to op high byte
            setbit   pd9020, [b]        ;turn on 90C20
            jmpl     puthi              ; before the backlight spwm1x:
            jsr      get4p
spwm1a:
            clrbit   txc0, cntrl        ;turn off the timer
            setbit   chrgb, portgd      ; and force the charger off
            setbit   chrgb, portgc      ; G3 is an output
            ld       x, #transb
            ld       b, #t1ralo
            ld       a, [x+]            ;transfer the first 2 parameters
            x        a, [b+]
            ld       a, [x+]
            x        a, [b]
            ld       b, #t1rblo         ;then do the next two
            ld       a, [x+]
            x        a, [b+]
            ld       a, [x]
            x        a, [b]
            ld       cntrl, #0B0        ; turn on timer
            setbit   chrgb, crgmde
            ret spwm2x:
            jsr      get4p              ;transfer indirect to allow alt entry
spwm2a:
            clrbit   txc0, t2cntrl      ;Make sure we're off to start
            setbit   chrga, portld      ; including the FET control line
            setbit   chrga, portlc      ; make L4 an output
            ld       x, #transb
            ld       b, #t2ralo
            ld       cnt, #4            ;transfer 4 parameters
t2loop:
            ld       a, [x+]
            x        a, [b+]
            drsz     cnt
            jp       t2loop ld       t2cntrl, #0B0      ;enable pwm mode
            setbit   chrga, crgmde
            ret stcrg1:
            bitif    acav, portcp      ;don't try to charge from batteries
            ret
            jsrl     clrbsy            ;clear battery detect
            bitif    bdt, portlp       ;is there a battery present
            ret                        ; nop if no battery present
            bitif    bankb, oplow      ;default to bank A, which will ensure
```

APPENDIX A

```
         jsr      cngbnk              ;that A path has the relay cap. & We may add a cap. in B
path
         jsr      ckrbat              ;charge Rbat while fast charging, if needed
         bitif    nimhd, portcp       ;test battery contact. This signal is high on new bottom boards
         jp       stcrg2
         ret                          ;don't allow NIMH bat to charge in a 320N system
stcrg2:
         ld       second, #seccnt     ;reset the seconds counter
         ld       minute, #min1       ; and the minute counter also
         ld       tdelay, #12         ;wait 12 sec to test temperature
         setbit   crgdly, mode        ; then enable NiMH test
         clrbit   blinkc, flashb
         clrbit   crgled, portcd      ;indicate start of charge cycle
         ld       syscnt, #8
         ld       lcdcnt, #1
         ld       hdcnt, #1
         jsr      clrold              ;clear the peak readings
         ld       baimin, #0FF
         ld       bbimin, #0FF
         ld       bavmax, #0
         ld       bbvmax, #0
         ld       avcnst, #cvtimr
         ld       bvcnst, #cvtimr
         clrbit   trklec, crgmde      ;not trickle charge
         setbit   charge, crgmde      ;indicate we're really charging .if      nimh
         jsrl     getemp              ;returns the temperature in A
         add      a, #50              ;setup a delta T of 15C
         x        a, initemp          ;initial tempreture + 15C
         .endif jmp      sttrkl              ;fast charge starting point ; TRICKL puts the system in trickle charge mode
;
trklof:
         clrbit   charge, crgmde      ;make sure no charge active
         clrbit   trklec, crgmde      ;no longer in trickle charge mode
         setbit   crgled, portcd      ;turn off the charge led
         clrbit   blinkc, flashb
         jsr      t1off               ; so turn off the charge timers
         jsr      t2off
         clrbit   chrga, portlc      ; and timer output bits
         clrbit   chrgb, portgc
         jmp      dlypmd        ;**  ;initialize min and max trickl:
         jsrl     ckrbat              ;check if Rbat needs to be charged
;        ld       batcnt, #1          ;so we'll come back next time
trklon:
         bitif    nimhd, portcp       ;test battery contact
         jp       trkl00              ; could be NiCd or NiMH
```

APPENDIX A

|  |  |  |  |
|---|---|---|---|
|  | jp | trklof | ;if NiMH detected then this is a old board |
| trkl00: |  |  |  |
|  | .if | nimh |  |
|  | jsrl | getemp | ;returns the temperature in A |
|  | ifgt | a, #maxnih | ;don't charge if too hot |
|  | jp | trklof | ;don't charge NiMH with old board |
|  | .endif |  |  |
|  | clrbit | charge, crgmde | ; reset mode |
|  | setbit | crgled, portcd | ;turn off the charge led |
|  | bitif | acav, portcp | ;don't try to charge from batteries |
|  | ret |  |  |
|  | jsr | clrbsy | ;clear battery detect |
|  | bitif | bdt, portlp | ;is there a battery present |
|  | ret |  | ; nop if no battery present |
|  | bitif | syson, flashb | ;is the cpu operating normally |
|  | jp | trkl01 | ; then continue |
|  | setbit | blinkc, flashb | ; else flash the charge led |
| trkl01: |  |  |  |
|  | setbit | trklec, crgmde |  |
| sttrkl: |  |  |  |
|  | ld | b, #transb |  |
|  | ld | [b+], #mincrg | ;set small duty cycle to start |
|  | ld | [b+], #00 |  |
|  | ld | [b+], #(maxcrg-mincrg) |  |
|  | ld | [b], #00 |  |
|  | jsr | spwm2a | ;start Bat A charging |
|  | ld | b, #transb |  |
|  | ld | [b+], #mincrg | ;set small duty cycle to start |
|  | ld | [b+], #00 |  |
|  | ld | [b+], #(maxcrg-mincrg) |  |
|  | ld | [b], #00 |  |
|  | jsr | spwm1a | ;start Bat B charging |
| xphase: | jsrl | t1off | ;force duty cycle (ontime) out of phase |
|  | jsrl | t2off | ;turn PWMs off |
|  | setbit | txc0, cntrl | ;then reenable them |
|  | jsrl | wait50 | ;try to put pulses out of phase |
|  | setbit | txc0, t2cntrl | ;then re-enable it |
|  | ret |  |  |
| strslp: |  |  |  |
|  | jsr | drvoff | ;turn off the drive |
|  | jsrl | dspof0 | ;turn off the display |
|  | jsr | c20off | ;turn off the 90C20 |
|  | jsr | sleep | ;slow the clock |
|  | ld | erc, #1 | ;setup to flash every two seconds |
|  | ret |  |  |
| chkac: |  |  |  |
|  | ld | b, #ophigh |  |
|  | clrbit | iom, [b] |  |
|  | jsrl | puthi |  |

APPENDIX A

```
            jsrl    clrbsy              ;reset the latch
            ld      a, mode             ;get the contents of the mode byte
            and     a, #lobat2+lobat3
            swap    a                   ;swap nibbles
            bitif   lobat1, mode
            or      a, #020
            bitif   bankb, oplow        ;test for active bank
            or      a, #08              ;set bit 3 if bank B is selected
            bitif   acav, portcp        ;test for ac available
            jp      chkac1              ; if AC not avail
            or      a, #acav
chkac1:
            bitif   swx, portgp         ;also check standby switch
            jp      chkac2
            or      a, #swx             ;if switch is down
chkac2:
            bitif   bdt, portlp
            jp      chkac5              ;Skip type determination if no battery
            or      a, #bdt bitif   nimhd, portcp       ;test Ni metal hydride contact .if     nimh
            jp      chkac3
            jp      chkac4              ;if NiMH detected
chkac3:
            push    a                   ;save the current flag byte
            jsrl    getemp              ;test the temperature
            ifgt    a, #4               ; and allow for offset in COP A/D
            setbit  nihdet, batmsc      ;done this way to set flag with either
            pop     a                   ; temp or previous nimhd detect
            bitif   nihdet, batmsc
chkac4:
            .else
            jp      chkac5
            .endif
            or      a, #nimhd           ;set bit if contact made
chkac5:
            x       a, portd            ;put the flags in the D port
            except  sramw, 01F81        ;and write them to SRAM
            ld      a, oplow            ;get the state of OP Low
            x       a, portd            ; and put in the D port
            except  sramw, 01F82        ; then write to SRAM
            ld      a, ophigh           ;now get the high byte
            x       a, portd            ; and put it in the D port
            except  sramw, 01F83        ; then write to SRAM
            ret strflg:
            setbit  notrkl, mode        ;do not allow trickle charge
            jmpl    trklof              ;turn off charger pmoff:
            clrbit  bdt, wken           ;disable BDT interrupt
```

APPENDIX A

```
            clrbit    stbyen. sysbyt         ;do not allow standby button
            setbit    flshmd. sysbyt
            ld        b. #ophigh
            clrbit    fetoff. [b]            ;turn on fet across power switch
            jmpl      puthi flash0:
            jsr       get1p
            ifeq      transb. #0
            jmp       pmoff
            setbit    bdt. wken              ;turn battery detect back on
            setbit    stbyen. sysbyt         ;reenable standby button
            clrbit    flshmd. sysbyt
            ld        b. #ophigh
            setbit    fetoff. [b]            ;turn fet back off
            jmpl      puthi ckrbat:
            ld        enad. #087             ;read rbat voltage
            ld        a. #L(sresti)          ;get rbat operation time
            jsrl      m1e00
            ifgt      a. #min4/4             ;charge if used for more than 1 minute
            jp        ckac                   ;charge reserve battery if ac available
ckr00:
            nop                              ;delay for A/D conversion
            nop
            ld        a. adrslt              ;get the reserve voltage
            ld        enad. #0               ;Put A/D in low power mode
            ifgt      a. #vrmin              ;test for minimum allowed voltage
            ret
crgrbt:
            jmp       rbstrt ckac:
            ld        enad. #0               ;Put A/D in low power mode
            bitif     acav. portcp           ;Next test for AC power
            jp        ck2min                 ;2 minutes operation before charg from bat
            jp        crgrbt
ck2min:
            ifgt      a. #min4/2             ;if more than 2 minutes
            jp        crgrbt                 ; charge even if no AC
            jp        ckr00                  ; otherwise check voltage ; This routine will become master and write the data in TEMP to HT21 ctl reg 5
;
htctlw:

; first set IO_M~ to IO in OPH
            ld        b. #ophigh             ;point to the op register data storage
            setbit    iom. [b]               ; D port data = 10000000 for IO
            jsrl      puthi ld        x. #temp               ;pointer for data to be output
```

APPENDIX A

```
; next, set up DRQ5 in OPL
        ld      a, oplow            ;get the op register data
        x       a, portd            ; so we can retreive this later
        ld      a, portd            ; emulate a store instruction
        or      a, #drq5            ;set the drq5 bit in the register save data
        x       a, portd            ; D port data = 00000001 for DRQ5
        ld      b, #portcd
        clrbit  milsad, [b]         ; C0 = 0
        setbit  milstb, [b]         ; C1 = 1 (this starts the DREQ cycle)

; now look for DACK
        ckdack

; next, pull master high in OPL
        ld      b, #portd           ; point to the D port
        setbit  master, [b]         ; D port data = 00000011 for master*
        clrbit  milstb, portcd      ; close the OP Low register ; Set the HT21 index register
        ld      [b], #05            ;point to the sleep control register
        except  iow, 01ED ; write desired data to D port
        x       a, [x]              ;recover the data to output
        x       a, [b]              ; and store it in port D ; execute the io write exception cycle to port 01EFh (HT21 Control)
        except  iow, 01EF x       a, [x]              ;and recover original OP low ; clear DRQ and master*
        x       a, [b]              ; A contains the original OP Low value
        ld      b, #portcd          ; point back to port C
        setbit  milstb, [b]         ; turn off master mode
        clrbit  milstb, [b]

; now set IO_M~ to M in OPH
        ld      b, #ophigh          ;point to the op register data storage
        clrbit  iom, [b]            ;point to memory
        jmpl    puthi cpuhld:
        ld      b, #portlp          ;point to the L port
        clrbit  cpuint, wkpnd       ;clear the interrupt pending flag
        bitif   cpuint, [b]         ;wait for the interrupt to be acknowledged
        jsrl    delay               ; by the host cpu
        jsr     chkact              ;test for I/O activity
        jp      cpuxit              ; if activity present don't stop cpu
        ld      a, oplow            ;get the op register data
        x       a, portd            ; so we can retreive this later
        ld      a, portd            ; emulate a store instruction
        or      a, #drq5            ;set the drq5 bit in the register save data
```

APPENDIX A

```
        x       a, portd              ; D port data = 00000001 for DRQ5
        ld      b, #portcd
        clrbit  milsad, [b]           ; C0 = 0
        setbit  milstb, [b]           ; C1 = 1 (this starts the DREQ cycle)

ckdack

; next, pull master high in OPL
        ld      b, #portd             ; point to the D port
        setbit  master, [b]           ; D port data = 00000011 for master*
        clrbit  milstb, portcd        ; close the OP Low register
        x       a, [b]                ; recover current OP Low settings
        x       a, oplow              ; and save
cpuxit:
        setbit  hldreq, mode          ;Tell interested parties about hold
        ld      b, #wkpnd
        clrbit  kbdint, [b]           ;Clear keyboard but not timer to start
        setbit  kbdint, wken
        setbit  cpuint, wken
        ret chkact:
        bitif   ioact, portgp         ;test for I/O activity
        jp      actxit                ; if active don't stop cpu
        retsk
actxit:
        jsrl    clrbsy                ;instead attempt to clear the flag
        ret clrold:
        jsrl    rstpmd                ;setup averages for main battery
        ld      a, batry              ; and for the reserve
        ret drvof1:
        ld      hdcmd, #0E0           ;Enter standby command ; This routine will become master and write the data in hdcmd to the Hard disk ctl reg
;
iow1f7:

; first set IO_M~ to IO in OPH
        ld      b, #ophigh            ;point to the op register data storage
        setbit  iom, [b]              ; D port data = 10000000 for IO
        jsrl    puthi ld      x, #hdcmd             ;pointer for data to be output ; next, set up DRQ5 in OPL
        ld      a, oplow              ;get the op register data
        x       a, portd              ; so we can retreive this later
        ld      a, portd              ; emulate a store instruction
        or      a, #drq5              ;set the drq5 bit in the register save data
        x       a, portd              ; D port data = 00000001 for DRQ5
```

APPENDIX A

```
        ld      b, #portcd
        clrbit  milsad, [b]             ; C0 = 0
        setbit  milstb, [b]             ; C1 = 1 (this starts the DREQ cycle)

; now look for DACK
        ckdack

; next, pull master high in OPL
        ld      b, #portd               ; point to the D port
        setbit  master, [b]             ; D port data = 00000011 for master*
        clrbit  milstb, portcd          ; close the OP Low register except  ior, 03F6               ;read alternate status port
        x       a, [b]                  ;save OP Low              **
        ld      a, #L(03F6)             ;to retreive io data
        jsrl    ior300
        ifbit   7, a                    ;test disk busy status
        jp      hdbusy                  ;try again later
        ifeq    pendng, #0              ;no delay
        jp      hdwrit
        drsz    pendng                  ;else lets wait a while
        jp      hdexit
hdwrit:
        clrbit  hdpnd, lcdseq           ;operation complete
        x       a, [b]                  ;recover registers for now **

; write desired data to D port
        x       a, [x]                  ;recover the data to output
        x       a, [b]                  ; and store it in port D ; execute the io write exception cycle to port 01F7h (HD Control)
        except  iow, 01F7 x       a, [x]                  ;and recover original OP low

; clear DRQ and master*
        x       a, [b]                  ; A contains the original OP Low value
hdexit:
        ld      b, #portcd              ; point back to port C
        setbit  milstb, [b]             ; turn off master mode
        clrbit  milstb, [b]

; now set IO_M~ to M in OPH
        ld      b, #ophigh              ;point to the op register data storage
        clrbit  iom, [b]        ;point to memory
        jsrl    puthi
        clrbit  hdcs0, wkpnd            ;so we don't interrupt again
        ret hdbusy:
        ld      a, lcdseq
        and     a, #%hdpnd              ;mask off pending bit
        ifeq    a, #0
        ld      pendng, #12             ;set the flag for 60 msec delay
```

APPENDIX A

```
        setbit    hdpnd, lcdseq
        jp        hdexit

; This routine waits for the hard disk to finish an operation
;
dskbsy:

; first set IO_M~ to IO in OPH
        ld        b, #ophigh              ;point to the op register data storage
        setbit    iom, [b]                ; D port data = 10000000 for IO
        jsrl      puthi ; next, set up DRQ5 in OPL
        ld        a, oplow                ;get the op register data
        x         a, portd                ; so we can retreive this later
        ld        a, portd                ; emulate a store instruction
        or        a, #drq5                ;set the drq5 bit in the register save data
        x         a, portd                ; D port data = 00000001 for DRQ5
        ld        b, #portcd
        clrbit    milsad, [b]             ; C0 = 0
        setbit    milstb, [b]             ; C1 = 1 (this starts the DREQ cycle)

; now look for DACK
        ckdack

; next, pull master high in OPL
        ld        b, #portd               ; point to the D port
        setbit    master, [b]             ; D port data = 00000011 for master*
        clrbit    milstb, portcd          ; close the OP Low register
dbusy:
        except    ior, 03F6               ;read alternate status port
        ld        a, #L(03F6)             ;to retreive io data
        jsrl      ior300
        ifbit     7, a                    ;test disk busy status
        jp        dbusy                   ;try again ld        a, oplow                ;and recover original OP low x         a, [b]                  ; A contains the original OP Low value
        ld        b, #portcd              ; point back to port C
        setbit    milstb, [b]             ; turn off master mode
        clrbit    milstb, [b]

; now set IO_M~ to M in OPH
        ld        b, #ophigh              ;point to the op register data storage
        clrbit    iom, [b]                ;point to memory
        jsrl      puthi
        clrbit    hdcs0, wkpnd            ;so we don't interrupt again
        ret tog:
        ld        b, #oplow
        setbit    lowbat, [b]             ;turn on the low batt LED
        jsrl      putlow
```

APPENDIX A

```
            ld      b, #portcd
            clrbit  crgled, [b]         ; also the charge LED
            clrbit  pwrled, [b]         ; and the power LED
            ret kildsp:
            ld      b, #oplow           ;set the OP low byte
            clrbit  lcdon, [b]          ; to turn off the backlight inverter
            clrbit  vddon, [b]          ; to turn off the -5v to the LCD
            jmpl    putlow togl:
            ld      b, #oplow
            setbit  lowbat, [b]         ;turn on the low batt LED
            jsrl    putlow
            ld      b, #portcd
            clrbit  crgled, [b]         ; turn the charge LED on
            setbit  pwrled, [b]         ; and the power LED off
            ret ;
; CHK1ST does a checksum of the first 100h locations in the program.
; This can be extended to check all of program memory by adding a
;       LAID
;       RET
; to every 100h block of memory, and then looping through each call
; 100h times as below.
;
chk1st:
            ld      b, #ophigh
            clrbit  iom, [b]            ;make sure we're set to memory cycle
            jsrl    puthi ld      cnt, #0             ;loop counter (must be a register)
            ld      ckadr, #0           ;address in the block
            ld      ckdata, #0AA        ;seed for checksum
ckloop:
            ld      a, ckadr            ;get the current addresss to check
            inc     a                   ;increment for next time
            x       a, ckadr            ;save the incremented value
            jsrl    cksm00              ;get the contents from the address in block 0
            add     a, ckdata           ;and add in the running total
            x       a, ckdata           ;store it back
            drsz    cnt                 ;do this 256 times
            jp      ckloop
            ld      a, ckdata           ;get the checksum
            x       a, portd            ;to report to host
            except  sramw, 01f81        ;return checksum as 1st parameter
            ret lbbeep:
            bitif   lobat2, mode        ;override if already in low bat 2
            jp      nobeep
            drsz    avcnst
```

APPENDIX A

```
            ret
            ld      avcnst, #(seccnt/2)-1       ; for .5 seconds per beep
            jsrl    stbeep
            drsz    bvcnst                      ;do this 5 times
            ret
nobeep:
            clrbit  lb1bep, flashb              ; and only 5 times
            ret
```

;This is a routine to test I/O writes to the host processor bus

; The X register is used to point to the Data to be output
; The B register points to Port D during the data transfer

```
iow080:
; first set IO_M- to IO in OPH
            ld      b, #ophigh                  ;point to the op register data storage
            setbit  iom, [b]                    ; D port data = 10000000 for IO
            jsrl    puthi ld      x, #temp                    ;pointer for data to be output ; next, set up DRQ5 in OPL
            ld      a, oplow                    ;get the op register data
            x       a, portd                    ; so we can retreive this later
            ld      a, portd                    ; emulate a store instruction
            or      a, #drq5                    ;set the drq5 bit in the register save data
            x       a, portd                    ; D port data = 00000001 for DRQ5
            ld      b, #portcd
            clrbit  milsad, [b]                 ; C0 = 0
            setbit  milstb, [b]                 ; C1 = 1 (this starts the DREQ cycle)

; now look for DACK ckdack

; next, pull master high in OPL
            ld      b, #portd                   ; point to the D port
            setbit  master, [b]                 ; D port data = 00000011 for master*
            clrbit  milstb, portcd              ; close the OP Low register ; write desired data to D port
            x       a, [x]                      ;recover the data to output
            x       a, [b]                      ; and store it in port D ; execute the io write exception cycle to port 80h
            except  iow, 080 x       a, [b]                      ;recover data
            x       a, [x]                      ;and return to temp while recovering A ; clear DRQ and master*
            x       a, [b]                      ; A contains the original OP Low value
            ld      b, #portcd                  ; point back to port C
```

APPENDIX A

```
            setbit   milstb, [b]              ; turn off master mode
            clrbit   milstb, [b]

; now set IO_M~ to M in OPH
            ld       b, #ophigh               ;point to the op register data storage
            clrbit   iom, [b]                 ;point to memory
            jmpl     puthi                    ; and return testio:
            jsr      chkact                   ;check for I/O activity
            jp       relhld                   ;release hold if still active
            bitif    drq5, oplow              ;are we in hold already
            ret                               ; if so just return
;**         jsr      drvoff                   ;make sure the drive is off
            jmp      cpuhld                   ;lowest power mode
relhld:
            ld       b, #ophigh               ;point to the op register data storage
            setbit   iom, [b]                 ; D port data = 10000000 for IO
            jsrl     puthi ld       b, #oplow                ;restore normal value
            clrbit   drq5, [b]
            clrbit   master, [b]
            jsrl     putlow
; now set IO_M~ to M in OPH
            ld       b, #ophigh               ;point to the op register data storage
            clrbit   iom, [b]                 ;point to memory
            jmpl     puthi                    ; and return ; FLASHC blinks the charge light by toggling it off/on once per second flashc:
            ld       b, #portcd
            bitif    crgled, [b]              ;is the LED off?
            jp       crglon                   ; then turn it on
            setbit   crgled, [b]              ; else turn it off
            ret
crglon:
            clrbit   crgled, [b]
            ret ; FLASHP uses the counter ERC to flash the power LED .5 seconds
; on every 2 seconds flashp:
            jsr      testio                   ;see if we're really in hold
            drsz     erc                      ;test the counter
            ret                               ;until underflow
            bitif    bdt, mode
            ld       bvcnst, #1               ;force beep
            bitif    poabep, flashb           ;should we beep
            jsrl     stbeep
            bitif    pwrled, portcp          ;test if light is off/on
            jp       pledon                   ;if off then turn on
```

APPENDIX A

```
            setbit      pwrled, portcd              ;turn led off
            ld          erc, #0                     ;off for approx 1.3 seconds
            bitif       lobat2, mode
            ret                                     ;don't affect low bat led
            bitif       bdt, mode
            jp          lblon                       ;turn on lowbat led
            ret
pledon:
            clrbit      pwrled, portcd              ;turn the led on
            ld          erc, #(seccnt/2)+1          ; for .5 seconds
            bitif       lobat2, mode
            ret                                     ;don't affect low bat led
            bitif       bdt, mode
            jp          lbloff                      ;turn off lowbat led
            ret lblon:
            bitif       lobat2, mode
            jsrl        setbep                      ;beep if low bat 2 mode
            ld          b, #oplow
            setbit      lowbat, [b]
            jmpl        putlow lbloff:
            jsrl        stpbep
lblof0:
            ld          b, #oplow
            clrbit      lowbat, [b]
            jmpl        putlow ; FLSHLB uses the counter AVCNST to flash the low bat LED .5sec on every
; second. This register is safe to use because we can't have a low
; battery condition while charging.

flshlb:
            drsz        avcnst                      ;test the counter
            ret
            ld          avcnst, #(seccnt/2)+1       ; for .5 seconds
            bitif       lowbat, oplow               ;is the LED already on?
            jp          lbloff                      ; then turn it off
            jp          lblon                       ; else turn it on tstbat:
            ld          a, #07                      ;set single & divide by 16, bank A
            bitif       bankb, oplow                ;if on bank B
            or          a, #040                     ; setup to read battery B's voltage
            x           a, enad                     ;and enable A/D converter
            ld          a, enad                     ; retreive the enable command
            xor         a, #040                     ; setup to read the other channel
            nop                                     ;Time delay to complete conversion
            nop
            nop
            nop
            jsrl        delay1                      ;10 more cop clocks delay
```

APPENDIX A

```
        x       a. enad              ;start the next cycle
        ld      a. adrslt  ; get the previous value
        ld      b. #adrslt           ;delay and setup for compare
        nop
        nop
        nop
        nop
        jsrl    delay1               ;10 more cop clocks delay
        ld      enad. #0 ;Put A/D in low power mode
        rc                           ;clear the carry
        adc     a. #mindlt           ; and adjust for no load voltage
        ifgt    a. [b]               ;no load V must be greater then loaded V+delta
        ret                          ; or we won't switch
        retsk ; READV momentairly turns off the charger and rereads the battery voltages ready:  ;there is no need to turn any charger off before polloing voltage and current
        ld      enad. #07            ;start voltage reading for A batt
        ld      b. #enad
        ld      x. #transb           ;use the transb location to pass readings
        rc
        nop                          ;delay to wait for conversion to
        nop                          ; be complete
        nop
        nop
        nop
        nop
        nop
        nop
avlop:
        nop
        nop
        nop
        ld      a. [b]               ;get the enable command
        adc     a. #040              ;bump to the next channel
        x       a. [b+]              ; and start the next conversion
        adc     a. #080              ;to set the carry on the last reading
        ld      a. [b-]              ;read the previous result
        x       a. [x+]              ; and store it
        ld      a. [x+]              ;bump x to point to next channel
        ifnc                         ;test for overflow
        jp      avlop                ; and continue till done
        ld      enad. #0             ;Put A/D in low power mode ret testad:
        bitif   ampson. ophigh
        jp      tstadx
        ret
tstadx:
        ld      b. #batav            ;point to start of A/D value table
        ld      cnt. #8              ;eight entries
```

APPENDIX A

```
tstad0:
        ld      a, [b]              ;get a value
        ifeq    a, #0FF             ; and test for saturation
        setbit  adfail, batmsc      ;if failing set flag
        drsz    cnt
        jp      tstad0              ;loop through all channels
        bitif   adfail, batmsc      ;if we failed
        ret ; These routines will handle timing the power up/down sequencing for the LCD frstof:
        clrbit  onetik, [b]         ;first 5 msec is over
        jmp     c20off              ; so assert pwrdwn* syncok:
        clrbit  sync, [b]           ;now the counter is in sync
        ret sequen:
        ld      b, #lcdseq          ;setup to test flags
        bitif   sync, [b]           ;syncronize with timer 0
        jp      syncok
        bitif   seqon, [b]
        jp      lcdson              ;do turn on sequence
        bitif   seqoff, [b]
        jp      lcdoff
        bitif   hdpnd, [b]          ;test for hd routine pending
        ret
        ld      [b], #0             ;if none of the above
        ret lcdoff:
        bitif   onetik, [b]         ;first 5 msec delay period
        jp      frstof
        drsz    pendng              ;count down
        ret
        clrbit  seqoff, [b]
        ld      b, #oplow           ;point to the low byte
        clrbit  vddon, [b]          ; to turn off the +5v to the LCD
        jsrl    putlow              ;do it and return to caller
        jsr     c20on               ;turn the 90C20 back on
        bitif   dlycdn, lcdseq
        jp      clrcdn
        ret frston:
        clrbit  onetik, [b]         ;first 5 msec is over
        jmp     c20on               ; so deassert pwrdwn* lcdson:
        bitif   onetik, [b]         ;first 5 msec delay period
        jp      frston
        drsz    pendng              ;count down
```

APPENDIX A

```
        ret
        clrbit   seqon, [b]
        bitif    hdpnd, [b]          ;hard disk also?
        ld       pendng, #8          ;reset hd delay
        ld       b, #oplow           ;point to the low byte
        setbit   lcdon, [b]          ; to turn on the backlight inverter
        jsrl     putlow              ;do it and return to caller
        bitif    dlycdn, lcdseq
        jp       clrcdn
        ret clrcdn:
        clrbit   dlycdn, lcdseq
        ld       b, #ophigh
        clrbit   iom, [b]            ;make sure we're set to memory for CDONE
        jsrl     puthi
        rbit     ipnd, psw           ;reset external interrupt pending flag
        sbit     1, psw              ; enable external interrupt
        except   scdone, 0           ; set CDONE for the host
        ret ; CKSRAM will look for a A5h at address 1E02 to indicate that the SRAM
; data has been initialized. If it does not find the A5h it will clear
; the area between 1E02 and 1EFF, and then store an A5 at 1E02.

cksram:
        ld       a, #L(sinitf)       ;get lower byte of address
        jsrl     m1e00
        ifeq     a, #flgval
        ret
        ld       b, #ophigh
        clrbit   iom, [b]            ;make sure we're set to memory cycle
        jsr      puthi
        ld       portd, #0
        except   sramw, sresti
        except   sramw, srescr
        except   sramw, srescr+1
        except   sramw, sresdi
        except   sramw, sresdi+1
        except   sramw, dmy008
        except   sramw, dmy009
        except   sramw, dmy00A
        except   sramw, dmy00B
        except   sramw, dmy00C
        except   sramw, dmy00D
        except   sramw, dmy00E
        except   sramw, dmy00F
        except   sramw, dmy010
        except   sramw, dmy011
        except   sramw, dmy012
        except   sramw, dmy013
        except   sramw, dmy014
        except   sramw, dmy015
```

APPENDIX A

```
        except  sramw, dmy016
        except  sramw, dmy017
        except  sramw, dmy018
        except  sramw, dmy019
        except  sramw, dmy01A
        except  sramw, dmy01B
        except  sramw, dmy01C
        except  sramw, dmy01D
        except  sramw, dmy01E
        except  sramw, dmy01F
        except  sramw, dmy020
        except  sramw, dmy021
        except  sramw, dmy022
        except  sramw, dmy023
        except  sramw, dmy024
        except  sramw, dmy025
        except  sramw, dmy026
        except  sramw, dmy027
        except  sramw, dmy028
        ld      portd, #0FF         ;force initial charge of rbat
        except  sramw, sresti
        ld      portd, #flgval      ;area now initialized
        except  sramw, sinitf
        ret lbtst:
        bitif   acav, portcp        ;no low bat test if ac available
        jp      lbt0
        jmp     cmderr
lbt0:
        setbit  lbt, debug
        jp      sysext
cendt:
        setbit  cct, debug
sysext:
        setbit  dlycdn, ledseq      ;to tell processor we have finished
        ret
actst:
        setbit  act, debug
        jp      sysext sysim0:
        jsr     getlp
        ld      a, transb
        ifeq    a, #0
        jp      snap                ;take immediate image
        bitif   lbt, a              ;is this a discharge test?
        jp      lbtst
        bitif   charge, crgmde      ;do not allow following tests unless
        jp      sysim1
        jmp     snap                ;end of fast charge. get last snap
sysim1:
        bitif   cet, a              ;test at charge end?
```

APPENDIX A

```
            jp      cendt              ; then branch to apropriate test
            bitif   act, a             ;adjust charge?
            jp      actst
            jmp     cmderr snap:
            ld      b, #ophigh
            clrbit  iom, [b]           ;make sure we're set to memory cycle
            jsrl    puthi ld      x, #second         ;first do registers
            ld      b, #portd ld      a, [x+]            ;get a byte
            x       a, [b]             ;and put it in port D
            except  sramw, 01E80
            ld      a, [x+]            ;get a byte
            x       a, [b]             ;and put it in port D
            except  sramw, 01E81
            ld      a, [x+]            ;get a byte
            x       a, [b]             ;and put it in port D
            except  sramw, 01E82
            ld      a, [x+]            ;get a byte
            x       a, [b]             ;and put it in port D
            except  sramw, 01E83
            ld      a, [x+]            ;get a byte
            x       a, [b]             ;and put it in port D
            except  sramw, 01E84
            ld      a, [x+]            ;get a byte
            x       a, [b]             ;and put it in port D
            except  sramw, 01E85
            ld      a, [x+]            ;get a byte
            x       a, [b]             ;and put it in port D
            except  sramw, 01E86
            ld      a, [x+]            ;get a byte
            x       a, [b]             ;and put it in port D
            except  sramw, 01E87
            ld      a, [x+]            ;get a byte
            x       a, [b]             ;and put it in port D
            except  sramw, 01E88
            ld      a, [x+]            ;get a byte
            x       a, [b]             ;and put it in port D
            except  sramw, 01E89
            ld      a, [x+]            ;get a byte
            x       a, [b]             ;and put it in port D
            except  sramw, 01E8A
            ld      a, [x+]            ;get a byte
            x       a, [b]             ;and put it in port D
            except  sramw, 01E8B
            ld      a, [x+]            ;get a byte
            x       a, [b]             ;and put it in port D
            except  sramw, 01E8C
            ld      a, [x+]            ;get a byte
            x       a, [b]             ;and put it in port D
```

APPENDIX A

```
        except   sramw, 01E8D
        ld       a, [x+]           ;get a byte
        x        a, [b]                     ;and put it in port D
        except   sramw, 01E8E
        ld       a, [x]            ;get a byte
        x        a, [b]                     ;and put it in port D
        except   sramw, 01E8F ld       x, #ophigh                 ;point to the data area ld       a, [x+]           ;get ophigh
        x        a, [b]                     ;and put it in port D
        except   sramw, 01E90
        ld       a, [x+]           ;get oplow
        x        a, [b]                     ;and put it in port D
        except   sramw, 01E91
        ld       a, [x+]           ;get saveb
        x        a, [b]                     ;and put it in port D
        except   sramw, 01E92
        ld       a, [x+]           ;get savex
        x        a, [b]                     ;and put it in port D
        except   sramw, 01E93
        ld       a, [x+]           ;get a byte
        x        a, [b]                     ;and put it in port D
        except   sramw, 01E94
        ld       a, [x+]           ;get a byte
        x        a, [b]                     ;and put it in port D
        except   sramw, 01E95
        ld       a, [x+]           ;get a byte
        x        a, [b]                     ;and put it in port D
        except   sramw, 01E96
        ld       a, [x+]           ;get a byte
        x        a, [b]                     ;and put it in port D
        except   sramw, 01E97
        ld       a, [x+]           ;get a byte
        x        a, [b]                     ;and put it in port D
        except   sramw, 01E98
        ld       a, [x+]           ;get a byte
        x        a, [b]                     ;and put it in port D
        except   sramw, 01E99
        ld       a, [x+]           ;get a byte
        x        a, [b]                     ;and put it in port D
        except   sramw, 01E9A
        ld       a, [x+]           ;get a byte
        x        a, [b]                     ;and put it in port D
        except   sramw, 01E9B
        ld       a, [x+]           ;get a byte
        x        a, [b]                     ;and put it in port D
        except   sramw, 01E9C
        ld       a, [x+]           ;get a byte
        x        a, [b]                     ;and put it in port D
        except   sramw, 01E9D
        ld       a, [x+]           ;get bbimin
        x        a, [b]                     ;and put it in port D
```

APPENDIX A

```
except  sramw. 01E9E
ld      a, [x-]         ;get avwork
x       a, [b]          ;and put it in port D
except  sramw. 01E9F
ld      a, [x+]         ;get a byte
x       a, [b]          ;and put it in port D
except  sramw  01EA0
ld      a, [x+]         ;get a byte
x       a, [b]          ;and put it in port D
except  sramw. 01EA1
ld      a, [x+]         ;get a byte
x       a, [b]          ;and put it in port D
except  sramw. 01EA2
ld      a, [x+]         ;get a byte
x       a, [b]          ;and put it in port D
except  sramw. 01EA3
ld      a, [x+]         ;get a byte
x       a, [b]          ;and put it in port D
except  sramw. 01EA4
ld      a, [x+]         ;get a byte
x       a, [b]          ;and put it in port D
except  sramw. 01EA5
ld      a, [x+]         ;get mode
x       a, [b]          ;and put it in port D
except  sramw. 01EA6
ld      a, [x+]         ;get a byte
x       a, [b]          ;and put it in port D
except  sramw. 01EA7
ld      a, [x+]         ;get a byte
x       a, [b]          ;and put it in port D
except  sramw. 01EA8
ld      a, [x+]         ;get a byte
x       a, [b]          ;and put it in port D
except  sramw. 01EA9
ld      a, [x+]         ;get a byte
x       a, [b]          ;and put it in port D
except  sramw. 01EAA
ld      a, [x+]         ;get a byte
x       a, [b]          ;and put it in port D
except  sramw. 01EAB
ld      a, [x+]         ;get a byte
x       a, [b]          ;and put it in port D
except  sramw. 01EAC
ld      a, [x+]         ;get bavmin
x       a, [b]          ;and put it in port D
except  sramw. 01EAD
ld      a, [x+]         ;get a byte
x       a, [b]          ;and put it in port D
except  sramw. 01EAE
ld      a, [x+]         ;get a byte
x       a, [b]          ;and put it in port D
except  sramw. 01EAF
ld      a, [x+]         ;get alrmct
x       a, [b]          ;and put it in port D
```

APPENDIX A

```
except   sramw. 01EB0
ld       a, [x+]           ;get a byte
x        a, [b]            ;and put it in port D
except   sramw. 01EB1
ld       a, [x+]           ;get a byte
x        a, [b]            ;and put it in port D
except   sramw. 01EB2
ld       a, [x+]           ;get ckdata
x        a, [b]            ;and put it in port D
except   sramw. 01EB3
ld       a, [x+]           ;get smibyt
x        a, [b]            ;and put it in port D
except   sramw. 01EB4
ld       a, [x+]           ;get lcdseq
x        a, [b]            ;and put it in port D
except   sramw. 01EB5
ld       a, [x+]           ;get debug
x        a, [b]            ;and put it in port D
except   sramw. 01EB6
ld       a, [x+]           ;get avsave0
x        a, [b]            ;and put it in port D
except   sramw. 01EB7
ld       a, [x+]           ;get a byte
x        a, [b]            ;and put it in port D
except   sramw. 01EB8
ld       a, [x+]           ;get a byte
x        a, [b]            ;and put it in port D
except   sramw. 01EB9
ld       a, [x+]           ;get a byte
x        a, [b]            ;and put it in port D
except   sramw. 01EBA
ld       a, [x+]           ;get a byte
x        a, [b]            ;and put it in port D
except   sramw. 01EBB
ld       a, [x+]           ;get a byte
x        a, [b]            ;and put it in port D
except   sramw, 01EBC
ld       a, [x+]           ;get a byte
x        a, [b]            ;and put it in port D
except   sramw. 01EBD
ld       a, [x+]           ;get avsave7
x        a, [b]            ;and put it in port D
except   sramw. 01EBE
ld       a, [x+]           ;get achrgc0
x        a, [b]            ;and put it in port D
except   sramw. 01EBF
ld       a, [x+]           ;get a byte
x        a, [b]            ;and put it in port D
except   sramw. 01EC0
ld       a, [x+]           ;get a byte
x        a, [b]            ;and put it in port D
except   sramw, 01EC1
ld       a, [x+]           ;get a byte
x        a, [b]            ;and put it in port D
```

APPENDIX A

```
except   sramw, 01EC2
ld       a, [x+]              ;get a byte
x        a, [b]               ;and put it in port D
except   sramw, 01EC3
ld       a, [x+]              ;get a byte
x        a, [b]               ;and put it in port D
except   sramw, 01EC4
ld       a, [x+]              ;get a byte
x        a, [b]               ;and put it in port D
except   sramw, 01EC5
ld       a, [x+]              ;get a byte
x        a, [b]               ;and put it in port D
except   sramw, 01EC6
ld       a, [x+]              ;get bvsave0
x        a, [b]               ;and put it in port D
except   sramw, 01EC7
ld       a, [x+]              ;get a byte
x        a, [b]               ;and put it in port D
except   sramw, 01EC8
ld       a, [x+]              ;get a byte
x        a, [b]               ;and put it in port D
except   sramw, 01EC9
ld       a, [x+]              ;get a byte
x        a, [b]               ;and put it in port D
except   sramw, 01ECA
ld       a, [x+]              ;get a byte
x        a, [b]               ;and put it in port D
except   sramw, 01ECB
ld       a, [x+]              ;get a byte
x        a, [b]               ;and put it in port D
except   sramw, 01ECC
ld       a, [x+]              ;get a byte
x        a, [b]               ;and put it in port D
except   sramw, 01ECD
ld       a, [x+]              ;get a byte
x        a, [b]               ;and put it in port D
except   sramw, 01ECE
ld       a, [x+]              ;get bchrge0
x        a, [b]               ;and put it in port D
except   sramw, 01ECF
ld       a, [x+]              ;get a byte
x        a, [b]               ;and put it in port D
except   sramw, 01ED0
ld       a, [x+]              ;get a byte
x        a, [b]               ;and put it in port D
except   sramw, 01ED1
ld       a, [x+]              ;get a byte
x        a, [b]               ;and put it in port D
except   sramw, 01ED2
ld       a, [x+]              ;get a byte
x        a, [b]               ;and put it in port D
except   sramw, 01ED3
ld       a, [x-]              ;get a byte
x        a, [b]               ;and put it in port D
```

APPENDIX A

```
except  sramw, 01ED4
ld      a, [x+]          ;get a byte
x       a, [b]                   ;and put it in port D
except  sramw, 01ED5
ld      a, [x+]          ;get a byte
x       a, [b]                   ;and put it in port D
except  sramw, 01ED6
ld      a, [x+]          ;get rvsave0
x       a, [b]                   ;and put it in port D
except  sramw, 01ED7
ld      a, [x+]          ;get a byte
x       a, [b]                   ;and put it in port D
except  sramw, 01ED8
ld      a, [x+]          ;get a byte
x       a, [b]                   ;and put it in port D
except  sramw, 01ED9
ld      a, [x+]          ;get a byte
x       a, [b]                   ;and put it in port D
except  sramw  01EDA
ld      a, [x+]          ;get a byte
x       a, [b]                   ;and put it in port D
except  sramw, 01EDB
ld      a, [x+]          ;get a byte
x       a, [b]                   ;and put it in port D
except  sramw, 01EDC
ld      a, [x+]          ;get a byte
x       a, [b]                   ;and put it in port D
except  sramw, 01EDD
ld      a, [x+]          ;get a byte
x       a, [b]                   ;and put it in port D
except  sramw, 01EDE
ld      a, [x+]          ;get transb0
x       a, [b]                   ;and put it in port D
except  sramw, 01EDF
ld      a, [x+]          ;get a byte
x       a, [b]                   ;and put it in port D
except  sramw, 01EE0
ld      a, [x+]          ;get a byte
x       a, [b]                   ;and put it in port D
except  sramw, 01EE1
ld      a, [x+]          ;get a byte
x       a, [b]                   ;and put it in port D
except  sramw, 01EE2
ld      a, [x+]          ;get a byte
x       a, [b]                   ;and put it in port D
except  sramw, 01EE3
ld      a, [x+]          ;get a byte
x       a, [b]                   ;and put it in port D
except  sramw, 01EE4
ld      a, [x+]          ;get a byte
x       a, [b]                   ;and put it in port D
except  sramw, 01EE5
ld      a, [x+]          ;get a byte
x       a, [b]                   ;and put it in port D
```

APPENDIX A

```
except  sramw, 01EE6
ld      a, [x+]         ;get a byte
x       a, [b]                  ;and put it in port D
except  sramw, 01EE7
ld      a, [x+]         ;get transb7
x       a, [b]                  ;and put it in port D
except  sramw, 01EE8 ld      x, #t2ralo              ;get the timer 2 pwm settings ld      a, [x+]         ;get t2ralo
x       a, [b]                  ;and put it in port D
except  sramw, 01EE9
ld      a, [x+]         ;get a byte
x       a, [b]                  ;and put it in port D
except  sramw, 01EEA
ld      a, [x+]         ;get t2rblo
x       a, [b]                  ;and put it in port D
except  sramw, 01EEB
ld      a, [x+]         ;get a byte
x       a, [b]                  ;and put it in port D
except  sramw, 01EEC ld      x, #t1ralo              ;get timer 1 pwm settings ld      a, [x+]         ;get t1ralo
x       a, [b]                  ;and put it in port D
except  sramw, 01EED
ld      a, [x+]         ;get t1rahi
x       a, [b]                  ;and put it in port D
except  sramw, 01EEE ld      x, #t1rblo ld      a, [x+]         ;get t1rblo
x       a, [b]                  ;and put it in port D
except  sramw, 01EEF
ld      a, [x]          ;get t1rbhi
x       a, [b]                  ;and put it in port D
except  sramw, 01EF0 jsr     clrcdn
ld      a, debug
and     a, #0F8
bitif   charge, crgmde
ret
ld      b, #ophigh              ;signal end of charge.
clrbit  iom, [b]        ;make sure we're set to memory cycle
jsrl    puthi ld      portd, #05A     ;indicate end of charge (for CRGMON)
except  sramw, 01f80    ;replace original command
ret
```

APPENDIX A

```
;
;************************************************
;       Instruction set checkout
;************************************************
instst:   ld        erc, #0   ;initialize error reference counter
;
; Section 1 - load memory locations with addresses.
;            This section utilizes all variations of the
;            load and exchange instructions.
;            Memory locations 010-01f are loaded with
;            their respective addresses.
;
          ld        010, #010
          ld        011, #011
          ld        b, #012
          ld        a, b
          x         a, [b]
          ld        a, [b+]
          inca
          x         a, [b+]
          ld        [b+], #014
          ld        [b], #015
          ld        A, #00A
          add       a, b
          ld        b, #01f
          x         a, [b]
          ld        a, [b-]
          deca
          x         a, [b]
          ld        a, [b]
          deca
          x         a, b
          ld        a, b
          x         a, [b-]
          ld        [b-], #01c
          ld        [b-], #01b
          ld        x, #01a
          ld        a, x
          x         a, [x]
          ld        a, [x-]
          deca
          x         a, [x-]
          ld        a, #002
          x         a, x
          sc
          subc      a, x
          rc
          x         a, x
          ld        a, x
          x         a, [x]
          ld        a, [x+]
          inca
```

APPENDIX A

```
        x      a. [x+]
        ld     a. #018
        x      a. [x+]
        ld     a. [x]
        ifeq   a. #019   ;result=019?
        sc
        drsz   erc
        ifnc
;       jmp    er1
:
er1:    jsr    atoc
e1:     jp     e1
er4:    jsr    atoc
e4:     jp     e4
er5:    jsr    atoc
e5:     jp     e5
er8:    jsr    atoc
e8:     jp     e8
er9:    jsr    atoc
e9:     jp     e9
er10:   jsr    atoc
e10:    jp     e10
er11:   jsr    atoc
e11:    jp     e11
er12:   jsr    atoc
e12:    jp     e12
er13:   jsr    atoc
e13:    jp     e13
er14:   jsr    atoc
e14:    jp     e14
        nop
er15:   jsr    atoc
e15:    jp     e15
er16:   jsr    atoc
e16:    jp     e16
er17:   jsr    atoc
e17:    jp     e17
er18:   jsr    atoc
e18:    jp     e18
er19:   jsr    atoc
e19:    jp     e19
er20:   jsr    atoc
e20:    jp     e20
er21:   jsr    atoc
e21:    jp     e21
er22:   jsr    atoc
e22:    jp     e22
er23:   jsr    atoc
e23:    jp     e23
er24:   jsr    atoc
e24:    jp     e24
er25:   jsr    atoc
e25:    jp     e25
er26:   jsr    atoc
```

APPENDIX A

```
e26:    jp      e26
er27:   jsr     atoc
e27:    jp      e27
er28:   jsr     atoc
e28:    jp      e28
er29:   jsr     atoc
e29:    jp      e29
er30:   jsr     atoc
e30:    jp      e30
er31:   jsr     atoc
e31:    jp      e31
er32:   jsr     atoc
e32:    jp      e32
;
; Error subroutine - Error number output to port 80h
;              Error data stored in SRAM at 1FC0h
;
Atoc:
        push    a
        ld      b, #ophigh
        clrbit  iom, [b]        ;make sure we're set to memory cycle
        jsrl    puthi
        pop     a x       a, portd        ;setup error data
        except  sramw, 01FC0    ; and store in SRAM
        ld      a, erc          ;output error #
        x       a, temp         ; to port 80h
        jmp     iow080

;
; Section 13 - Multiply (16 x 16)
;
msetup: drsz    erc
        drsz    erc
        drsz    erc
        drsz    erc
        ld      a, #0cb
        ld      b, #0
        x       a, [b]
        ld      a, [b]
        ld      b, #3
        x       a, [b]
        ld      a, [b-]
        swap    a
        x       a, [b]
        ld      a, [b-]
        x       a, [b]
        jsr     mult
        drsz    erc
        ld      a, [b-]
        ifeq    a, #096
        jp      byp26
er49:   jsr     atoc
```

APPENDIX A

```
e49:    jp      e49
byp26:  drsz    erc
        ld      a, [b-]
        ifeq    a, #03f
        jp      byp27
er50:   jsr     atoc
e50:    jp      e50
byp27:  drsz    erc
        ld      a, [b-]
        ifeq    a, #09c
        jp      byp28
er51:   jsr     atoc
e51:    jp      e51
byp28:  drsz    erc
        ld      a, [b]
        ifeq    a, #014
        jp      nuinst
er52:   jsr     atoc
e52:    jp      e52
;
; Section 14 - Check new instructions
;
er53:   jsr     atoc
e53:    jp      e53
er54:   jsr     atoc
e54:    jp      e54
er55:   jsr     atoc
e55:    jp      e55
er56:   jsr     atoc
e56:    jp      e56 nuinst: ld      b, #0b
        ld      a, #0a

;
; COP 800 (16 x 16) multiply routine
;       Multiplicand in (1,0) multiplier in (3,2)
;       product in (5,4,3,2)
;
        cntr = 0f0
mult:   ld      cntr, #17
        ld      b, #4
        ld      [b+], #0
        ld      [b], #0
        ld      x, #0
        rc
mloop:  ld      a, [b]
        rrc     a
        x       a, [b-]
        ld      a, [b]
        rrc     a
        x       a, [b-]
        ld      a, [b]
```

APPENDIX A

```
         rrc     a
         x       a, [b-]
         ld      a, [b]
         rrc     a
         x       a, [b]
         ld      b, #5
         ifnc
         jp      test
         rc
         ld      b, #4
         ld      a, [x+]
         adc     a, [b]
         x       a, [b+]
         ld      a, [x-]
         adc     a, [b]
         x       a, [b]
test:    drsz    cntr
         jp      mloop
         ret
```

; The XSUMP routine checksums the system parameter data area to validate
; the initial settings in case of a total system power failure that
; causes the COP setings to be invalid

```
xsump:
         clr     a
         ld      x, #systim
         ld      b, #temp
         x       a, [b]              ;Clear the accumulator
         ld      cnt, #4
xslop:
         ld      a, [x+]             ;Get the parameter
         add     a, [b]              ; and add it to the accumulator
         x       a, [b]              ;save it back
         drsz    cnt
         jp      xslop
         ld      a, [b]              ;return with calculated checksum in A
         ret                         ; X points to stored checksum
```

; GET1P gets 1 parameter to the data location transb for test purposes

```
get4p:
         ld      cnt, #4
         jp      getp
get1p:
         ld      cnt, #1
getp:
         ld      x, #transb
         jmp     gvparm setbep:
         drsz    bvcnst              ;beep twice every 5 seconds
```

APPENDIX A

```
            ret
            ld      bvcnst, #1
            jp      stbeep beep5:
            ld      bvcnst, #4              ;to beep 4 more times after first
            ld      avcnst, #(seccnt/2)+1   ; for .5 seconds per beep
            setbit  lb1bep, flashb          ;set flag
            jp      stbeep                  ;do first beep stpbep:
            drsz    bvcnst
            ret
            ld      bvcnst, #9              ;wait 4.5 more seconds
    ;       jp      stbeep                  ; and fall through to beep routine stbeep:
            jsr     t2off                   ;make sure charger is off completly
            clrbit  chrga, portlc           ; so we can use this timer
            jsr     t1off                   ;this timer is duration
            clrbit  chrgb, portgc
            bitif   acav, portcp            ;test for ac available
            jp      stbep0                  ;jump if no AC
            rbit    intr, t2cntrl           ;make sure beep interrupts are disabled
            rbit    1, t2cntrl
            rbit    intr, icntrl            ;disable interrupts until the next beep
            rbit    1, icntrl
            ld      b, #ophigh
            clrbit  speakr, [b]             ;turn off the speaker
            jmp     puthi
stbep0:
            ld      b, #t2ralo              ;point to timer reload registers
            ld      [b+], #L(beepct-1)
            ld      [b+], #H(beepct-1)
            ld      [b+], #L(beepct-1)
            ld      [b], #H(beepct-1)
            ld      b, #t1ralo
            ld      [b+], #L(btime)
            ld      [b], #H(btime)
            ld      t2cntrl, #095           ;start the timer
            ld      cntrl, #090
            rbit    1, icntrl               ;clear the pending flag
            bitif   lobat3, mode
            ret                             ;dont turn off
            sbit    intr, icntrl            ; and enable the interrupt
            ret ;
; Decrement the various timeout counters
;
decent:
            ld      second, #seccnt         ;reset the seconds counter
            bitif   bdt, mode               ;test for operation on reserve
```

APPENDIX A

```
            jp      dec0            ; and skip decrement of tdelay except in tstnew
            ifeq    tdelay, #0      ;test new battery delay
            jp      dec0
            drsz    tdelay
            jp      dec0            ;wait to initialize
            bitif   initdc, batmsc  ;is this the first reading after a new battery
            jsr     rstpmd          ; then reset voltage readings
            jsr     resof0          ; including averages
dec0:
            bitif   rbin, portcd    ;is the reserve battery inactive?
            jp      dec00
            jsr     incrti          ; then increment reserve operation time
dec00:
            bitif   flshmd, sysbyt  ;don't check timeouts if flash active
            ret
            drsz    minute          ;decrement the minute counter
            jp      dec01           ; until the minute is up
            ld      minute, #min1   ;reset the minute counter
            bitif   bdt, mode       ;two minutes on reserve battery?
            jmp     spmoff          ; then turn off system
            bitif   lobat3, mode    ;10 seconds at cutoff level?
            jmp     spmoff          ; then turn off system
            jsr     decmin          ; then do our once a minute stuff
dec01:
            bitif   poa, flashb     ;don't do this again if already closed
            jp      dec01a
            bitif   stdeb2, flashb  ;We don't need to look unless switch is down
            jsr     tstpoa          ;check for case closed
dec01a:
            bitif   rbin, portcd
            jsr     readad          ;make new readings once per second
            bitif   chargc, crgmde  ;are we charging the batteries?
            jmp     adjcrg          ; if so then check for end. etc.
            bitif   blinkc, flashb  ;Should we blink the charge light?
            jmpl    flashc          ; then do it
            ld      a, sysbyt       ;to speed up checks bitif   acav, portcp    ;test for ac available
            jp      dec02           ;jmp if no AC
            ld      batcnt, #min1   ;reset battery timer and don't switch
            setbit  initdc, batmsc  ; also signal PM for initial bat switch
            bitif   acovrd, a       ;test for AC override
            jmp     stmout          ; and reset timeout counters if active
dec02:
            bitif   hdsec, a        ;is the hd timeout in seconds?
            jsr     rldhdc          ;reset the hard disk timeout
            ld      a, sysbyt       ;to speed up checks
            bitif   lcdsec, a       ;is lcd T.O. in seconds
            jsr     rldlcd
            ld      a, sysbyt       ;to speed up checks
            bitif   syssec, a       ;is system T.O. in seconds
            jsr     rldsys
            bitif   acav, portcp    ;test for ac available
            jp      dec03           ;jmp if no AC
```

APPENDIX A

```
                ret
dec03:
        ifeq    tdelay, #0          ;don't test batteries until after delay
        jsr     chklow
        bitif   lobat2, mode        ;don't change batteries if in lobat 2 mode
        ret
        bitif   bdt, mode           ;don't change batteries if waiting for new bat
        ret
        drsz    batcnt              ;# of seconds to change batteries
        ret
        jsr     cngbat
        ret                         ; to allow for a skip return if no error
        ret ; TSTSTB tests the standby button to see if the user is requesting
; standby mode tststb:
        ld      b, #flashb
        bitif   swx, portgp         ;is the standby switch depressed?
        jp      tsts01              ; low true so, if not pressed, check for release
        bitif   stdeb1, [b]         ;check debounce bit
        jp      tsts00
        setbit  stdeb1, [b]
        ret
tsts00:
        bitif   stdeb2, [b]
        ret
        setbit  stdeb2, [b]
        bitif   stbyen, sysbyt      ;is the standby switch enabled?
        bitif   crton, flashb       ;is the crt in use
        ret                         ; then just return
        jmp     dspof0              ;otherwise we'll turn off the lcd
tsts01:
        bitif   stdeb2, [b]
        jp      tsts02
        clrbit  stdeb1, [b]
        ret
tsts02:
        bitif   hldreq, mode        ;are we already in standby?
        jp      exstby              ; then exit
        bitif   poa, [b]            ;was the case closed?
        jp      exstby              ; then don't enter standby when opened
        clrbit  stdeb1, [b]
        clrbit  stdeb2, [b]
        ld      alrmct, #0          ;switch is up, so clear count
        clrbit  poa, [b]
        bitif   stbyen, sysbyt      ;is the standby switch enabled?
        jmpl    stndby
        ret                         ;otherwise do nothing exstby:
```

APPENDIX A

```
        clrbit    stdeb2, [b]
        clrbit    stdeb1, [b]
        ld        alrmct, #0          ;switch is up, so clear count
        clrbit    poa, [b]
        clrbit    poabep, [b]
        jsr       hldoff              ;bring cpu out of hold
        ret
;
;
;Noise is considered any glitch, within 1 sec., that is 2 units or greater
;in magnitude. A/D readings are not allowed to increment or decrement more
;than one unit per second to overcome any glitch in the line. This
;algorithm is not applied when PWM is stepped
;

adjnois:
        ld        a, hdcnt
        ifne      a, #1               ;1 indicates that we didn't step recently
        jp        bnoise              ;since we just steped PWM on bank A
        ld        b, #avsave          ;A voltage array
        jsr       donoise
        ld        b, #achrge          ;A current array
        jsr       donoise
bnoise: ld        a, lcdcnt
        ifne      a, #1               ;1 indicates that we didn't step recently
        ret                           ;since we just steped PWM on bank B
        ld        b, #bvsave          ;B voltage array
        jsr       donoise
        ld        b, #bchrge          ;B current array
donoise:
        ld        a, [b+]
        ld        a, [b-]             ;A ptr to previous sec, B ptr to current sec.
        ifeq      a, [b]              ;nothing changed
        ret
        ifgt      a, [b]              ;-delta
        jp        negnois
        inc       a                   ;allow one increment per second, only
        jp        extnois
negnois:
        dec       a
extnois:x         a, [b]              ;allow one decrement per second, only
        ret
```

;Power up & reset variable and state initialization
;

```
Init:
        ld        pendng, #00         ;no delayed operations to start
        ld        debug, #0
        ld        lcdseq, #0
        ld        mode, #0
        ld        crgmde, #0
        ld        flashb, #crton
```

APPENDIX A

```
        ld      alrmct, #0
        ld      tdelay, #12         ;delay 12 seconds before checking low bat
        ld      batcnt, #min1       ;first battery change in 1 minutes
        ld      batmsc, #initdc     ;signal first operation ld      portcc, #0
        ld      portcd, #0
        ld      portlc, #0
        ld      portld, #0
        ld      portgc, #0
        ld      portgd, #0
        ld      enad, #0            ;Put A/D in low power mode ld      second, #seccnt     ;initialize timeout
        ld      minute, #min1 bitif   bdt, portlp         ;was the battery removed while we were off?
        clrbit  charge, batmsc  ;**
        ret
;-----------------------------------------------------------------

.=01E00
m1c00:
        laid                        ;Allow COP to store parameters
        ret                         ; at 1E02-1EFF .=01F00                     ;place this at the top of SRAM ; The GETCMD routine will return the value of a command
; placed at address 1F80h by the host CPU. The COP can
; then call GSPARM or GVPARM to retreive the parameters
; to an area in the data ram of the COP processor
;
; On Entry:
;
;       CNT contains the number of parameters to retreive
;
; for GVPARM
;
;       X contains the address to store the parameters in COP data space
;
; On Exit:
;
;       The PSAVE area contains the parameters getcmd:
        ld      a, #080             ;Address of command on this page
        laid                        ; get contents of 1F80h
        ret gsparm:
        ld      x, #psave           ;point to the COP parameter area
gvparm:
        ld      b, #temp            ;temporary storage
```

APPENDIX A

```
        ld    [b], #081      ;address of parameters in SRAM
ploop:
        ld    a, [b]         ;address of current parameter
        laid                 ; get parameter
        x     a, [x+]        ; and store it in data space
        x     a, [b]         ;get address
        inc   a              ; and bump it
        x     a, [b]         ; then put it back for next time
        drsz  cnt            ;decrement the counter
        jp    ploop          ; and continue till done
        ret
```

What is claimed is:

1. A method for controlling the power consumption of a personal computer system having interconnected by control and data bus lines a processor and at least one I/O device capable of operating in a reduced power consumption state, the method comprising the processor-implemented steps of:

establishing a first time interval, a second time interval, and a third time interval; monitoring for I/O activity associated with at least one said device;

placing at least one said device in a reduced power consumption state upon elapse of said first time interval in which no I/O activity is monitored; and increasing said first time interval by said second time interval if, subsequent to placement of said device in a reduced power consumption state, I/O activity of at least one said device is monitored prior to elapse of said third time interval.

2. The method of claim 1 further comprising the processor-implemented step of:

establishing a fourth time interval and a fifth time interval;

decreasing said first time interval by said fourth time interval if, subsequent to placement of said device in a reduced power consumption state, I/O activity of at least one said device is not monitored prior to elapse of said fifth time interval.

3. The method of claim 2 wherein said step of decreasing said first time interval further comprises limiting said decreased, first time interval to a minimum interval.

4. The method of claim 1 wherein said step of increasing said first time interval further comprises limiting said increased, first time interval to a maximum interval.

5. A method for controlling the power consumption of a personal computer system having interconnected by control and data bus lines a processor and at least one I/O device capable of operating in a reduced power consumption state, the method comprising the processor-implemented steps of:

establishing a first time interval, a second time interval, and a third time interval;

monitoring for I/O activity associated with at least one said device; placing at least one said device in a reduced power consumption state upon elapse of said first time interval in which no I/O activity is monitored; and decreasing said first time interval by said second time interval if, subsequent to placement of said device in a reduced power consumption state, I/O activity of at least one said device is not monitored until subsequent to elapse of said third time interval.

6. The method of claim 5 further comprising the processor-implemented step of:

establishing a fourth time interval and a fifth time interval;

increasing said first time interval by said fourth time interval if, subsequent to placement of said device in a reduced power consumption state, I/O activity of at least one said device is monitored prior to elapse of said fifth time interval.

7. The method of claim 6 wherein said step of increasing said first time interval further comprises limiting said increased, first time interval to a maximum interval.

8. The method of claim 5 wherein said step of decreasing said first time interval further comprises limiting said decreased, first time interval to a minimum interval.

9. A method for controlling the power consumption of a personal computer system having interconnected by control and data bus lines a processor and at least one I/O device capable of operating in a reduced power consumption state, the method comprising the processor-implemented steps of:

establishing a first time interval, a second time interval, a third time interval, a fourth time interval, and a fifth time interval;

monitoring signals on said lines for I/O activity associated with at least one said device;

generating signals on said lines placing at least one said device in a reduced power consumption state upon elapse of said first time interval in which no I/O activity is monitored;

increasing said first time interval by said second time interval if, subsequent to placement of said device in a reduced power consumption state, I/O activity of at least one said device is monitored on said lines prior to elapse of said third time interval; and decreasing said first time interval by said fourth time interval if, subsequent to placement of said device in a reduced power consumption state, I/O activity of at least one said device is not monitored on said lines until subsequent to elapse of said fifth time interval.

10. A method for controlling the power consumption of a personal computer system having interconnected by control and data bus lines a system bus a processor and at least one I/O device capable of operating in a reduced power consumption state, the method comprising the processor-implemented steps of:

establishing a first time interval, a second time interval, a third time interval, a fourth time interval, and a fifth time interval;

monitoring signals on said lines for I/O activity associated with at least one said device;

generating signals on said lines placing at least one said device in a reduced power consumption state upon elapse of said first time interval in which no I/0 activity is monitored;

increasing said first time interval by said second time interval if, subsequent to placement of said device in a reduced power consumption state, I/O activity of at least one said device is monitored on said lines prior to elapse of said third time interval;

limiting said increased, first time interval to a maximum interval;

decreasing said first time interval by said fourth time interval if, subsequent to placement of said device in a reduced power consumption state, I/O activity of at least one said device is not monitored on said lines until subsequent to elapse of said fifth time interval; and limiting said decreased, first time interval to a minimum interval.

11. A method for controlling the power consumption of a personal computer system, the system including a processor complex and input/output (I/O) devices each capable of operating in a reduced power consumption state, said complex and said devices being interconnected by control and data bus lines, the method comprising:

establishing a first time interval, a second time interval, a third time intervals, a fourth time interval, and a fifth time interval;

monitoring signals on said lines for I/O activity associated with at least one said device;

issuing a bus request signal to said complex upon elapse of said first time interval in which no I/O activity is monitored for gaining control of said bus lines as master independent of said complex;

generating signals on said lines as bus master independent of said complex to said at least one device for placing said at least one device in said reduced power consumption state;

deasserting said bus request signal to said complex for releasing control of said bus as master upon completion of said signal generation placing said at least one device in a reduced power consumption state;

increasing said first time interval by said second time interval if, subsequent to placement of said device in a reduced power consumption state, I/O activity of at least one said device is monitored on said lines prior to elapse of said third time interval; and decreasing said first time interval by said fourth time interval if, subsequent to placement of said device in a reduced power consumption state, I/O activity of at least one said device is not monitored on said lines until subsequent to elapse of said fifth time interval.

12. Apparatus for controlling the power consumption of a personal computer system having interconnected on control and data bus lines a processor and at least one I/O device capable of operating in a reduced power consumption state, the apparatus comprising:

logic implemented in said processor for establishing a first time interval, a second time interval, and a third time interval;

logic implemented in said processor for monitoring signals on said lines for I/O activity associated with at least one said device;

logic implemented in said processor for generating signals on said lines placing at least one said device in a reduced power consumption state upon elapse of said first time interval in which no I/O activity is monitored; and logic implemented in said processor for increasing said first time interval by said second time interval if, subsequent to placement of said device in a reduced power consumption state, I/O activity of at least one said device is monitored on said lines prior to elapse of said third time interval.

13. The apparatus of claim 12 further comprising:

logic implemented in said processor for establishing a fourth time interval and a fifth time interval;

logic implemented in said processor for decreasing said first time interval by said fourth time interval if, subsequent to placement of said device in a reduced power consumption state, I/O activity of at least one said device is not monitored on said lines until subsequent to elapse of said fifth time interval.

14. The apparatus of claim 13 wherein logic for decreasing said first time interval further comprises logic implemented in said processor for limiting said decreased, first time interval to a minimum interval.

15. The apparatus of claim 12 wherein said logic for increasing said first time interval further comprises logic implemented in said processor for limiting said increased, first time interval to a maximum interval.

16. The apparatus of claim 12 wherein said processor comprises a processor complex of said system.

17. The apparatus of claim 12 wherein said processor comprise a microcontroller separate from a processor complex of said system.

18. Apparatus for controlling the power consumption of a personal computer system having interconnected on control and data bus lines a processor and at least one I/O device capable of operating in a reduced power consumption state, the apparatus comprising:

logic implemented in said processor for establishing a first time interval, a second time interval, and a third time interval;

logic implemented in said processor for monitoring signals on said lines for I/O activity associated with at least one said device;

logic implemented in said processor for generating signals on said lines placing at least one said device in a reduced power consumption state upon elapse of said first time interval in which no I/O activity is monitored; and logic implemented in said processor for decreasing said first time interval by said second time interval if, subsequent to placement of said device in a reduced power consumption state, I/O activity of at least one said device is not monitored on said lines until subsequent to elapse of said third time interval.

19. The apparatus of claim 18 further comprising:

logic implemented in said processor for establishing a fourth time interval and a fifth time interval;

logic implemented in said processor for increasing said first time interval by said fourth time interval if, subsequent to placement of said device in a reduced power consumption state, I/O activity of at least one said device is monitored on said lines prior to elapse of said fifth time interval.

20. The apparatus of claim 19 wherein said logic for increasing said first time interval further comprises logic implemented in said processor for limiting said increased, first time interval to a maximum interval.

21. The apparatus of claim 18 wherein logic for decreasing said first time interval further comprises logic implemented in said processor for limiting said decreased, first time interval to a minimum interval.

22. The apparatus of claim 18 wherein said processor comprises a processor complex of said system.

23. The apparatus of claim 18 wherein said processor comprises a microcontroller separate from a processor complex of said system.

24. Apparatus for controlling the power consumption of a personal computer system having interconnected by control and data bus lines a processor and at least one I/O device capable of operating in a reduced power consumption state, the apparatus comprising:

logic implemented in said processor for establishing a first time interval, a second time interval, a third time interval, a fourth time interval, and a fifth time interval;

logic implemented in said processor for monitoring signals on said lines for I/O activity associated with at least one said device;

logic implemented in said processor for generating signals on said lines placing at least one said device in a reduced power consumption state upon elapse of said first time interval in which no I/O activity is monitored;

logic implemented in said processor for increasing said first time interval by said second time interval if, subsequent to placement of said device in a reduced power consumption state, I/O activity of at least one said device is monitored on said lines prior to elapse of said third time interval; and logic implemented in said processor for decreasing said first time interval by said fourth time interval if, subsequent to placement of said device in a reduced power consumption state, I/O activity of at least one said device is not monitored on said lines until subsequent to elapse of said fifth time interval.

25. The apparatus of claim 24 wherein said processor comprises a processor complex of said system.

26. The apparatus of claim 24 wherein said processor comprises a microcontroller separate from a processor complex of said system.

27. A microcontroller connected to the system bus of a personal computer system for managing the power consumption of the system, the system including on said bus a processor complex and input/output (I/O) devices each capable of operating in a reduced power consumption state, the microcontroller comprising:

- at least one signal line connected to at least one said device for receiving signals indicative of I/O activity of said at least one device;
- at least one control line connected to said complex for granting and relinquishing said microcontroller control of said system bus as master;
- logic for establishing a first time interval, a second time interval, a third time interval, a fourth time interval, and a fifth time interval;
- logic for monitoring said at least one signal line for said signals indicative of said I/O activity;
- logic for issuing a bus request signal on said control line to said complex upon elapse of said first time interval in which no I/O activity is monitored for gaining control of said bus as master independent of said complex;
- logic for generating signals on said at least one signal line as master of said bus independent of said complex to said at least one device for placing said at least one device in said reduced power consumption state;
- logic for deasserting on said at least one control line said bus request signal to said complex for releasing control of said bus as master upon completion of said signal generation placing said at least one device in a reduced power consumption state;
- logic for increasing said first time interval by said second time interval if, subsequent to placement of said device in a reduced power consumption state, I/O activity of at least one said device is monitored on said at least one signal line prior to elapse of said third time interval; and
- logic for decreasing said first time interval by said fourth time interval if, subsequent to placement of said device in a reduced power consumption state, I/O activity of at least one said device is not monitored on said at least one signal line until subsequent to elapse of said fifth time interval.

28. The microcontroller of claim 27 wherein said processor complex includes a central processing unit (CPU), said microcontroller further comprising:

- a CPU clock controller connected to said system bus; and
- logic for generating signals on said system bus as master independent of said complex to said CPU clock controller for reducing the processing speed of said CPU.

29. The microcontroller of claim 28 wherein said CPU processing speed is reduced to 0 megahertz.

30. The microcontroller of claim 28 wherein said CPU processing speed is reduced to 3.125 megahertz.

31. The microcontroller of claim 27 wherein said first time interval is a default interval.

32. The microcontroller of claim 27 wherein said establishing said first time interval comprises establishing by a user a time interval for each said at least one device.

* * * * *